(12) United States Patent
Nakamura et al.

(10) Patent No.: US 7,979,726 B2
(45) Date of Patent: Jul. 12, 2011

(54) INFORMATION PROCESSING APPARATUS USING SERVER COPY OF PREDETERMINED INFORMATION WHEN STORING PART IS IN POWER SAVING MODE

(75) Inventors: Takashi Nakamura, Kanagawa (JP); Sachiko Takeuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1637 days.

(21) Appl. No.: 11/177,443

(22) Filed: Jul. 11, 2005

(65) Prior Publication Data

US 2006/0010332 A1    Jan. 12, 2006

(30) Foreign Application Priority Data

Jul. 12, 2004 (JP) .................................. 2004-204987
Jul. 5, 2005 (JP) .................................. 2005-196803

(51) Int. Cl.
*G06F 1/26* (2006.01)
(52) U.S. Cl. ........................................ 713/323; 358/1.15
(58) Field of Classification Search .................. 709/229; 713/323; 358/1.15
See application file for complete search history.

(56) References Cited

U.S. PATENT DOCUMENTS

| | | | |
|---|---|---|---|
| 7,123,847 B2 * | 10/2006 | Maruyama ...................... | 399/19 |
| 7,334,146 B2 * | 2/2008 | Kobayashi et al. ........... | 713/324 |
| 2004/0080771 A1 | 4/2004 | Mihira et al. | |
| 2004/0187036 A1 | 9/2004 | Nakamura | |
| 2004/0227968 A1 | 11/2004 | Nakamura et al. | |
| 2006/0227367 A1 * | 10/2006 | Kitada ........................ | 358/1.15 |

FOREIGN PATENT DOCUMENTS

| | | |
|---|---|---|
| JP | 2002-84383 | 3/2002 |
| JP | 2003-72198 | 3/2003 |

* cited by examiner

*Primary Examiner* — Albert Wang
(74) *Attorney, Agent, or Firm* — Oblon, Spivak, McClelland, Maier & Neustadt, L.L.P.

(57) ABSTRACT

An information processing apparatus having a plurality of power modes having different power consumptions, includes: a storing part storing therein predetermined information; and a control part using the predetermined information from another server apparatus in which the predetermined information has been copied and stored, upon receiving a request for the predetermined information when the power mode of the storing part is a power saving mode.

21 Claims, 25 Drawing Sheets

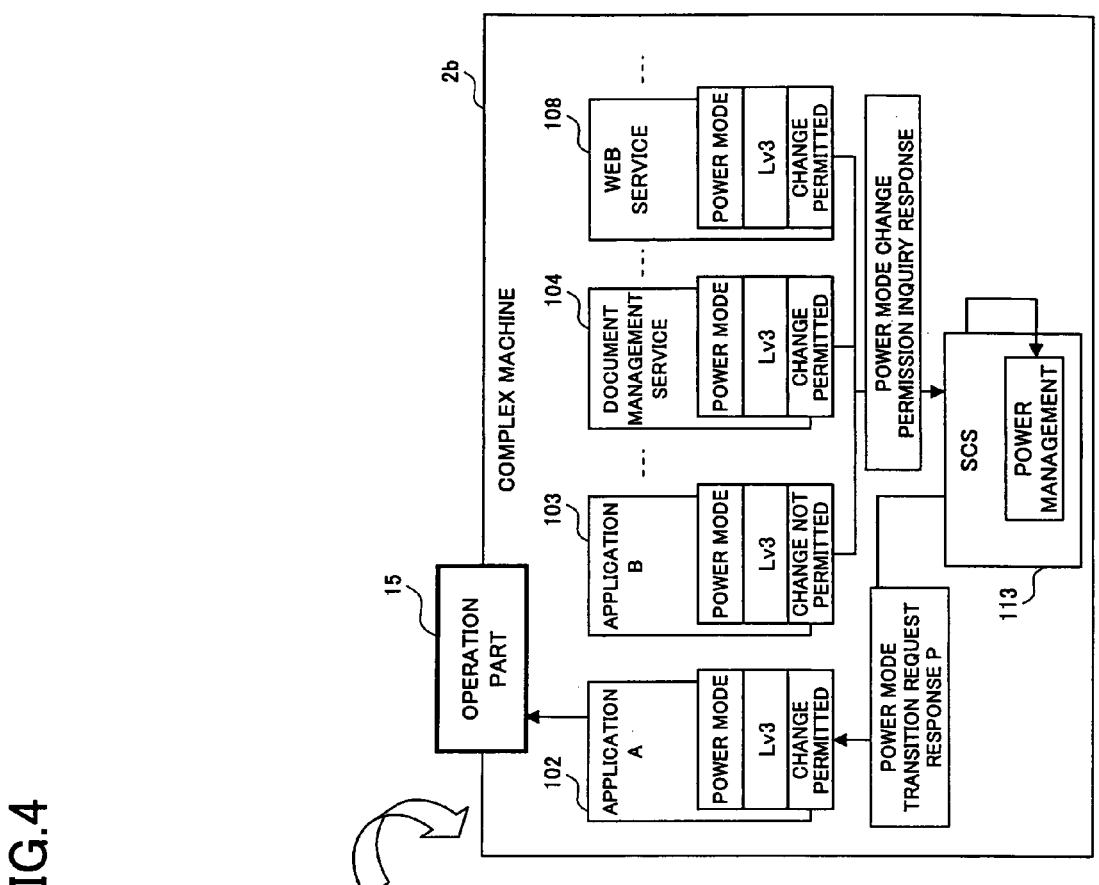
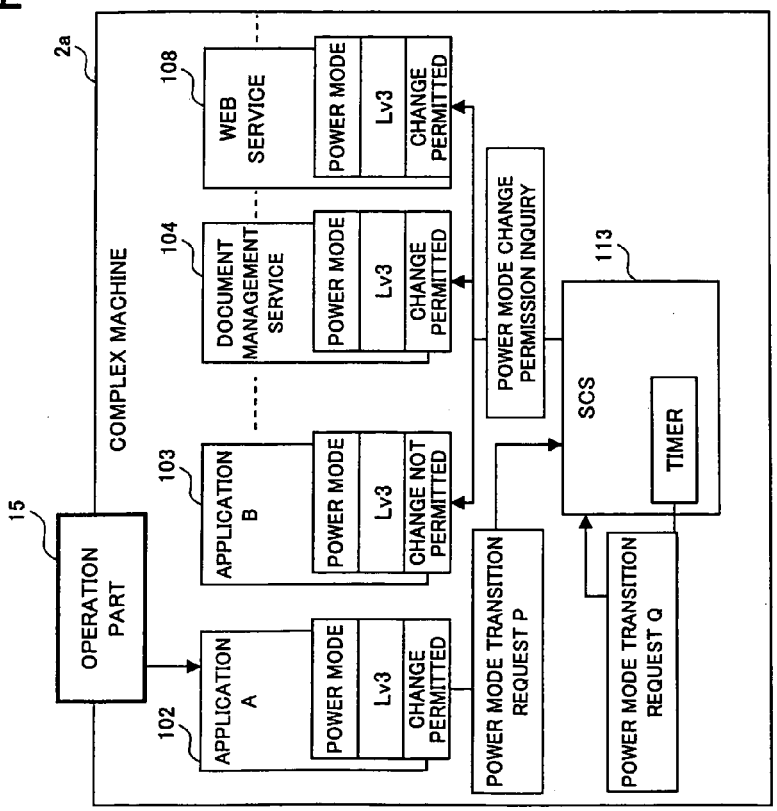
FIG.4

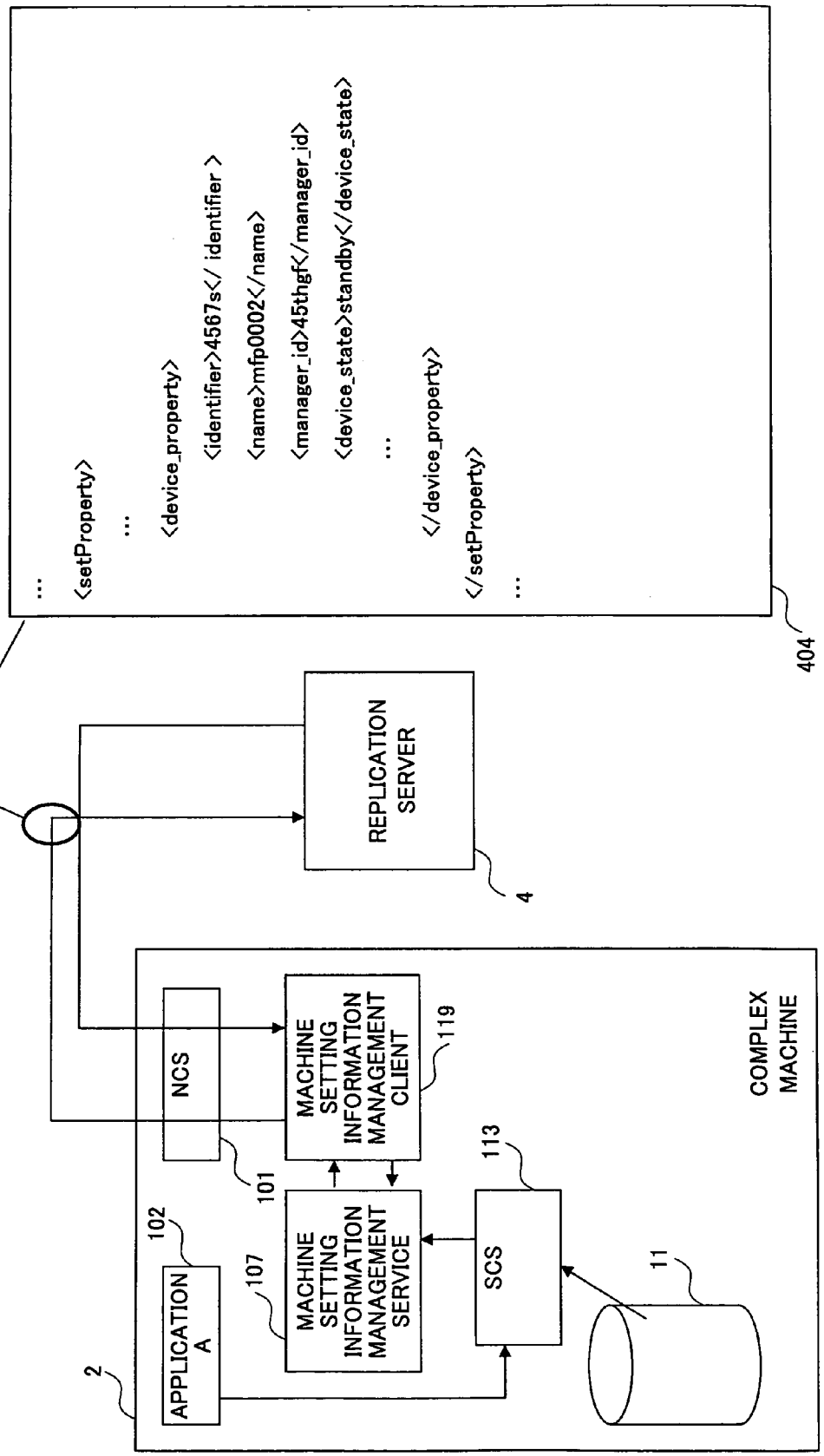

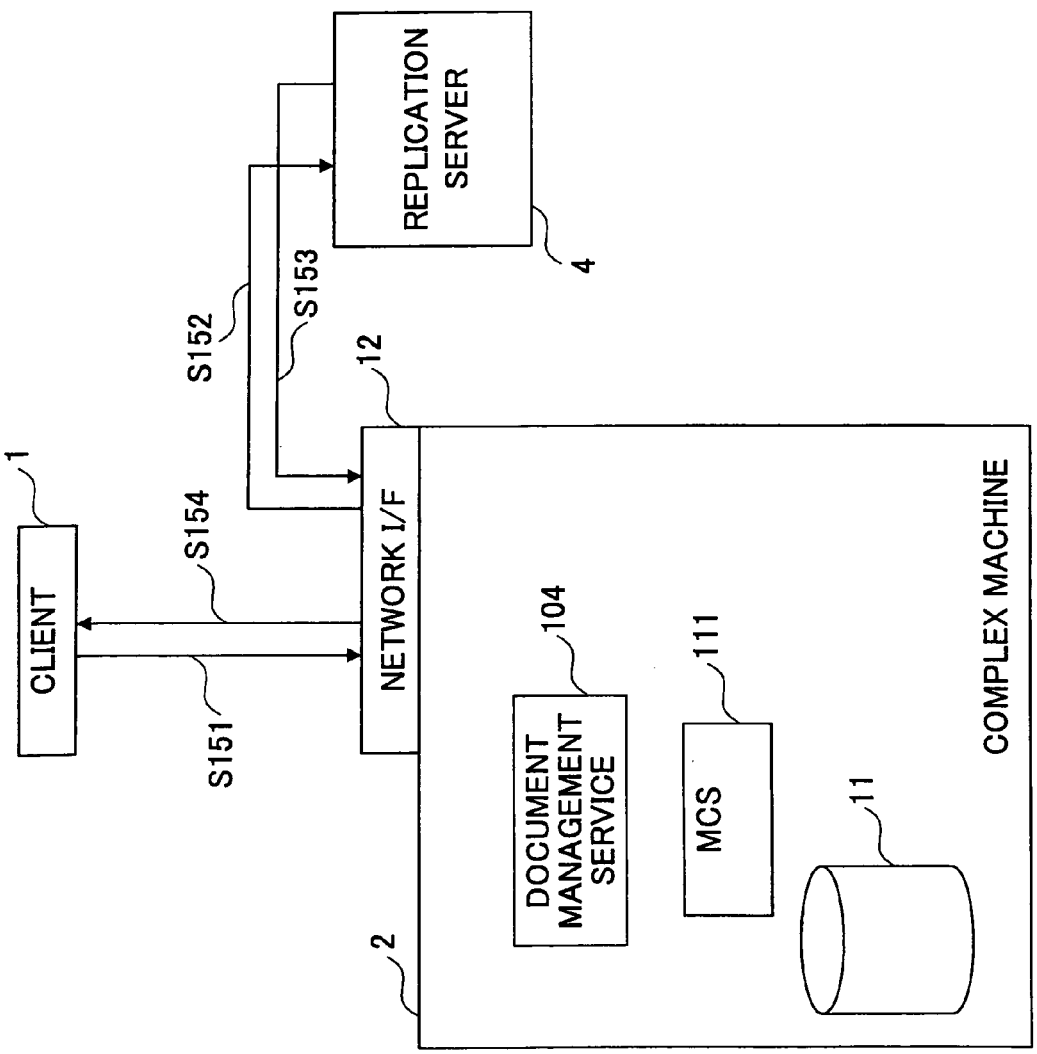

INFORMATION PROCESSING APPARATUS USING SERVER COPY OF PREDETERMINED INFORMATION WHEN STORING PART IS IN POWER SAVING MODE

BACKGROUND OF THE INVENTION

1. Field of the Invention

The present invention relates to an information processing apparatus having a plurality of power modes having different power consumptions, a power mode management method for the information processing apparatus, a power mode management program and a computer readable information recording medium, and, in particular, to an information processing apparatus copying predetermined information stored in a storing part, and storing the same in another server apparatus, a power mode management method for the information processing apparatus, a power mode management program and a computer readable information recording medium.

2. Description of the Related Art

Recently, an image forming apparatus, as one application of an information processing apparatus, which accommodates, in a single housing, respective functions of a printer, copier, a facsimile machine, a scanner and so forth, is known (referred to as a multifunction machine, hereinafter). Such a multifunction machine provides various functions in a form of Web services. For example, a user uses a Web service from a client connected with the multifunction machine via a communication network, and thus, may refer to various sorts of information stored in the multifunction machine.

Further, in many multifunction machines, in order to achieve power saving, a plurality of power modes having different power consumptions are provided (see Japanese Laid-open Patent Application No. 2003-72198, for example). The power modes include an ordinary mode in which all of the respective parts included in the multifunction machine are provided with operation power; and a power saving mode in which only minimum necessary parts are provided with operation power. In the power saving mode, further a plurality of levels may be provided in which the number of devices which are provided with operation power is reduced stepwise. For example, the multifunction machine enters the power saving mode from the ordinary mode when it has not been used for a predetermined period.

SUMMARY OF THE INVENTION

In the power saving mode, a storage device such as a HDD (hard disk drive) or such is made to enter a power turned off state. In the multifunction machine, upon receiving a processing request during the power saving mode, the power mode is changed from the power saving mode to the ordinary mode. For example, upon receiving a request for referring to various sorts of information stored in the storage device from a client connected via a communication network for example, the multifunction machine should supply operation power to the storage device.

Thus, in the multifunction machine having the plurality of power modes, power supply turning on and off should be carried out repetitively each time when a transition between the ordinary mode and the power saving mode occurs. There is a problem that the storage device is consumed due to such repetitious turning on/off of power supply thereto.

The present invention has been devised in consideration of this point, and, an object of the present invention is to provide an information processing apparatus, a power mode management method for the information processing apparatus, a power mode management program and a computer readable information recording medium storing therein the program, by which consumption of a device is avoided, while power saving is achieved.

In order to achieve this object, according to the present invention, an information processing apparatus having a plurality of power modes having different power consumptions, includes: a storing part storing therein predetermined information; and a control part using the predetermined information from another server apparatus in which the predetermined information has been copied and stored, upon receiving a request for the predetermined information when the power mode of the storing part is a power saving mode.

Further, according to the present invention, a power mode management method for an information processing apparatus having a plurality of power modes having different power consumptions, includes the steps of: a) receiving a request for predetermined information; b) determining the power mode of a storing part in which the predetermined information is stored; c) using the predetermined information from another server apparatus in which the predetermined information has been copied and stored, when the power mode is a power saving mode.

Further, according to the present invention, a power mode management program includes instructions for causing a computer, having a plurality of power modes having different power consumptions, to function as: a control part using the predetermined information from another server apparatus in which the predetermined information has been copied and stored, upon receiving a request for the predetermined information when the power mode of a storing part, in which the predetermined information is stored, is a power saving mode.

Further, according to the present invention, a computer readable information recording medium stores therein the above-mentioned power mode management program.

In the present invention, upon receiving a request for predetermined information when a power mode of a storing part in which the predetermined information is stored is a power saving mode, the predetermined information is used from another server apparatus in which the predetermined information is previously copied and stored. As a result, it is not necessary to change the power mode of the storing part from the power saving mode to the ordinary mode while the predetermined information can be used from the other server apparatus. That is, according to the present invention, the number of occasions of change in the power mode between the ordinary mode and the power saving mode can be reduced, and thus, consumption of the device can be avoided while power saving can be achieved by keeping the power saving mode.

Thus, according to the present invention, it is possible to provide a configuration of an information processing apparatus, a power mode management method, a power mode management program and a computer readable information recording medium, by which power saving can be achieved while consumption of a device can be avoided.

BRIEF DESCRIPTION OF THE DRAWINGS

FIG. 4 schematically shows power mode management processing carried out by the multifunction machine;

FIG. 24 schematically shows machine setting information transmitted from the multifunction machine 2 to the replication server 4 when the machine setting information is stored in the replication server; and FIG. 25 schematically shows one embodiment of processing in which document information stored in the multifunction machine is referred to by the client.

DESCRIPTION OF THE PREFERRED EMBODIMENTS

Figure 1:
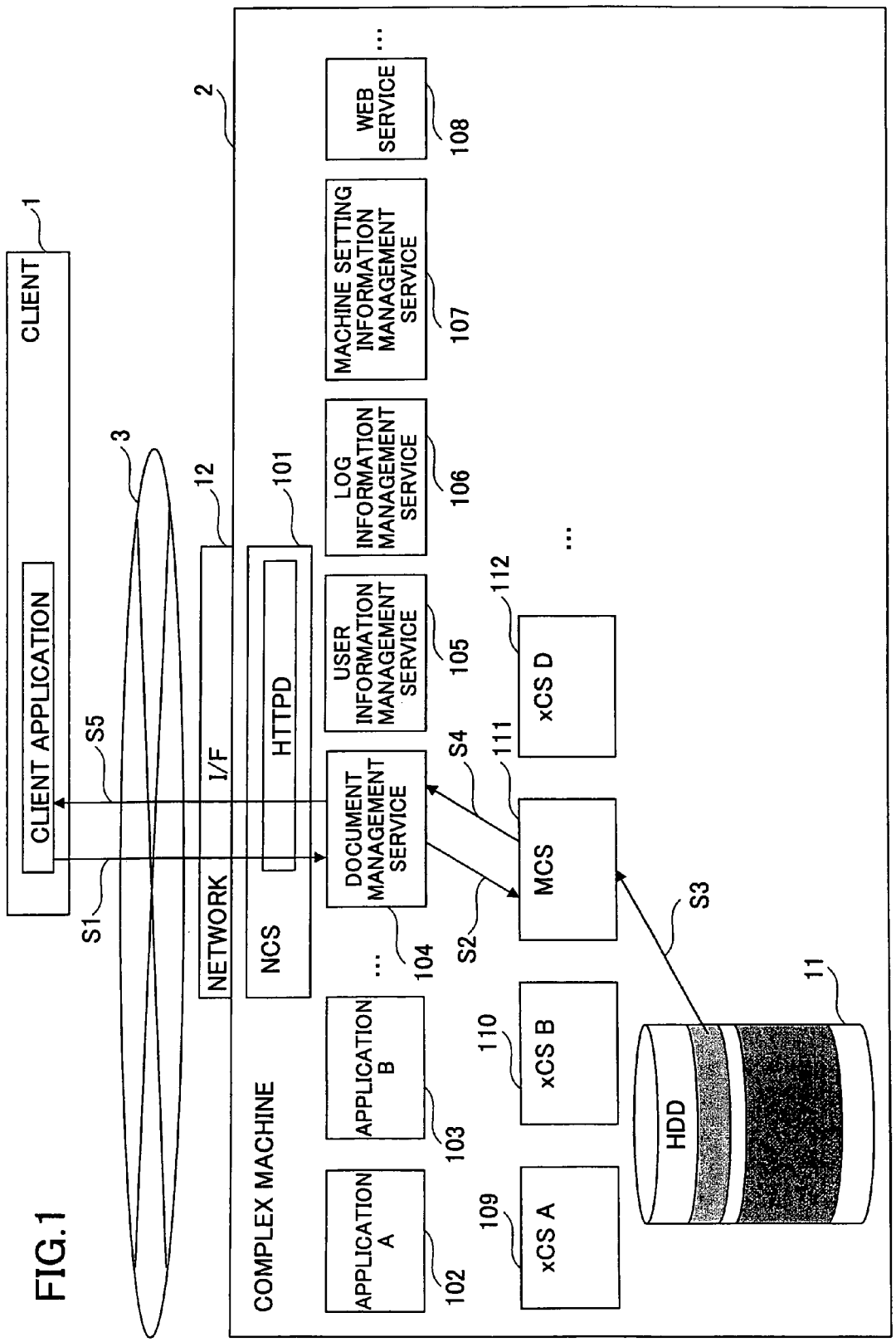
FIG. 1 schematically shows processing in which a client refers to document information stored in a multifunction machine.

A best mode for carrying out the present invention is described now with reference to figures based on preferred embodiments. It is noted that document information referred to in the embodiments may mean all the sorts of information which can be handled by multifunction machines, i.e., bibliographic information, image data and so forth FIG. 1 schematically shows processing in which a client refers to document information stored in a multifunction machine. A user requests reference to document information from the client 1 by operating it, for example. In Step S1, the reference request for document information from the client is notified of to a document management service 104 of the multifunction machine via a communication network 3 such as the Internet, LAN or such. The document management service 104 is a module managing various sorts of information (including document information) in the multifunction machine 1.

The client 1 is connected with the document management service 104 of the multifunction machine 2 via the network 3, a network I/F 12 and a NCS (network control service) 101. The NCS 101 is a module controlling data communication with client connected via the network 3. Then, in Step S2, the document management service 104 makes a request for obtaining the document information (referred to as the designated document information) designated by the reference request to an MCS 111. The MCS 111 is a module controlling access to a storage device such as a HDD 11.

Then, in Step S3, the MCS 111 obtains the designated document information from the HDD 11. In Step S4, the MCS 111 transmits the thus-obtained designated document information to the document management service 104 as a response to the obtaining request of Step S2. In Step S5, the document management service 104 transmits the thus-received designated document information to the client 1 as a response to the reference request of Step S1 via the network 3.

The NCS 101, an application A 102, an application B 103, the document management service 104, a user information management service 105, a log information management service 106, a machine setting information management service 107, a Web service 108, an xCS A 109, an xCS B 110, the MCS 111 and an xCS D 112 are examples of software modules provided on a controller board 10. For example, the multifunction machine 2 may be configured as disclosed by Japanese Laid-open Patent Application No. 2002-84383.

Figure 2:
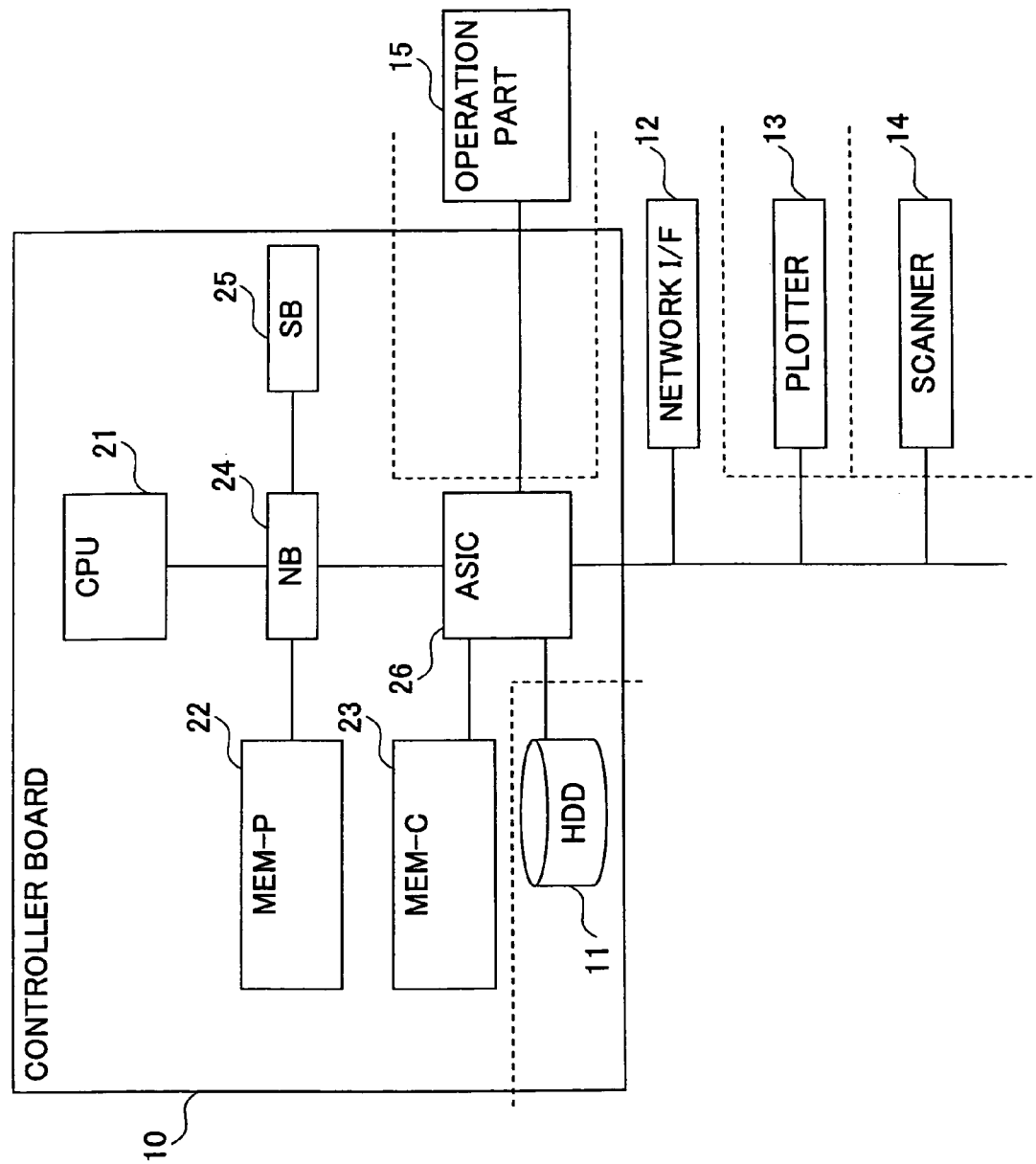
FIG. 2 shows a hardware configuration of one example of the multifunction machine.

FIG. 2 shows a hardware configuration of one example of the multifunction machine. The multifunction machine of FIG. 2 includes the controller board 10, the network I/F 12, a plotter 13, a scanner 14 and an operation part 15.

The controller board 10 has a CPU 21, a system memory (MEM-P) 22, a local memory (MEM-C) 23, a NB (north bridge) 24, a SB (south bridge) 25, an ASIC 26 and the HDD 11. Details of the multifunction machine 2 of FIG. 2 are disclosed by Japanese Laid-open Patent Application No. 2002-84383, for example.

When a power mode is a power saving mode, the multifunction machine 2 stops power supply to the HDD 11, the plotter 13, the scanner 14 and the operation part 15, for example. Further, the multifunction machine 2 supplies operation power to all the parts including the controller board 10, the network I/F 12, the plotter 13, the scanner 14 and the operation part 15, when the power mode is an ordinary mode.

Figure 3:
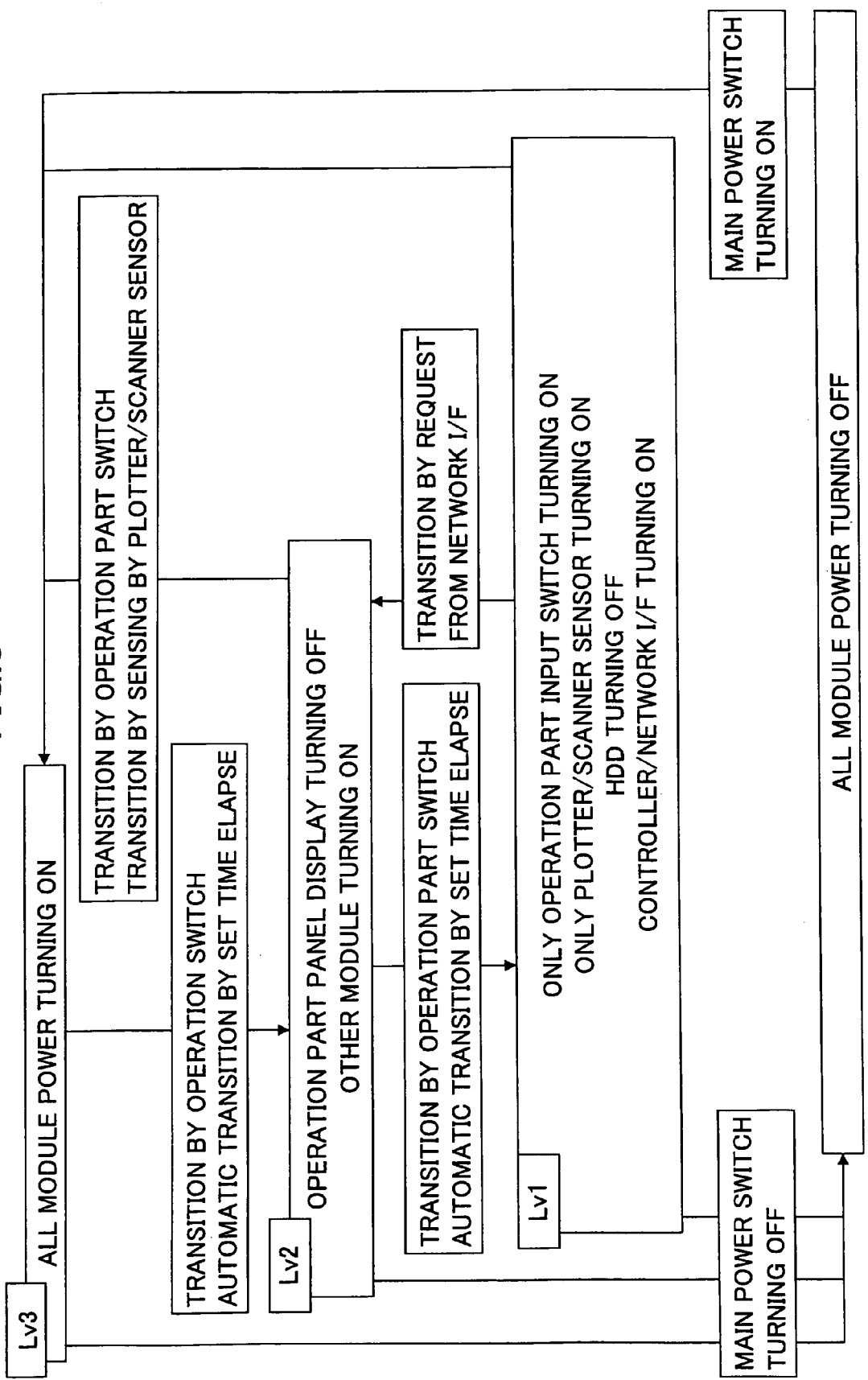
FIG. 3 shows a power mode state transition diagram in the multifunction machine.

FIG. 3 schematically shows a power mode state transition in the multifunction machine. In FIG. 3, as a plurality of power modes, a level 3 corresponds to an ordinary state; and levels 2 and 1 correspond to power saving modes. In the level 3 power mode, all the modules are provided with operation power, that is, power supply thereto is turned on. In the level 2 power mode, a panel display of the operation part 15 is turned off while the other modules are provided with operation power.

In the level 1 power mode, only input switches of the operation part 15 are activated by power, only sensors of the plotter 13 and the scanner 14 are activated by power, the HDD 11 is not provided with operation power, and the other modules are provided with operation power.

First, when a main power switch is turned on, power supply to all the modules are started, and thus, the multifunction machine 2 enters the level 3 power mode. By being triggered by predetermined switch operation or an elapse of set duration, the multifunction machine 2 enters the level 2 power mode from the level 3 power mode. Further, also by being triggered by predetermined switch operation or an elapse of a set duration, the multifunction machine 2 enters the level 1 power mode from the level 2 power mode.

In the level 2 power mode, by being triggered by predetermined switch operation or sensor sensing in the plotter 13 or the scanner 14, the multifunction machine 2 enters the level 3 power mode from the level 2 power mode. Similarly, in the level 1 power mode, by being triggered by predetermined switch operation or sensor sensing in the plotter 13 or the scanner 14, the multifunction machine 2 enters the level 3 power mode from the level 1 power mode.

Further, in the level 1 power mode, a request from the network I/F 12 causes the multifunction machine 2 to enter the level 2 power mode from the level 1 power mode. In any one of the level 1 through 3 power modes, when the main power switch is turned off, power supply to all the modules is turned off.

FIG. 4 shows power mode management processing carried out in the multifunction machine. A multifunction machine 2a represents a first half of the power mode management processing while a multifunction machine 2b represents the second half of the power mode management processing. For example, a panel display of the operation part 15 is carried out by the application A 102.

When a user carries out switch operation on the operation part 15 for changing the power mode, the operation part 15 notifies the application A 102 of this switch operation. The application A 102 notifies a SCS (system control service) 112 of the power mode transition request. The SCS 112 is a module managing the power mode. The SCS 113 has a timer function, and is notified of the power mode transition request also from the timer function when a set duration has elapsed.

When being notified of the power mode transition request from the application A 102 or from the timer function, the SCS 113 makes a power mode change permission inquiry request to respective modules, other than the application A 102, i.e., the application B 103, the document management service 104, the Web service 108 and so forth.

Each of the modules such as the application A 102, the application B 103, the document management service 104, the Web service 108 and so forth has its own power mode level and the power mode level change permission information. The modules, other than the application A 102, i.e., the application B 109, the document management service 104, the Web service 108 and so forth return power mode change permission inquiry responses to the above-mentioned power mode change permission inquiry request, respectively, to the SCS 113. The SCS 113 determines whether or not power mode transition should be actually carried out, according to the power mode change permission inquiry responses, and makes a power mode transition request response to the power mode transition request, to the application A 102.

The application A 102 causes the operation part 15 to make a panel display according to the power mode transition response.

Figure 5:
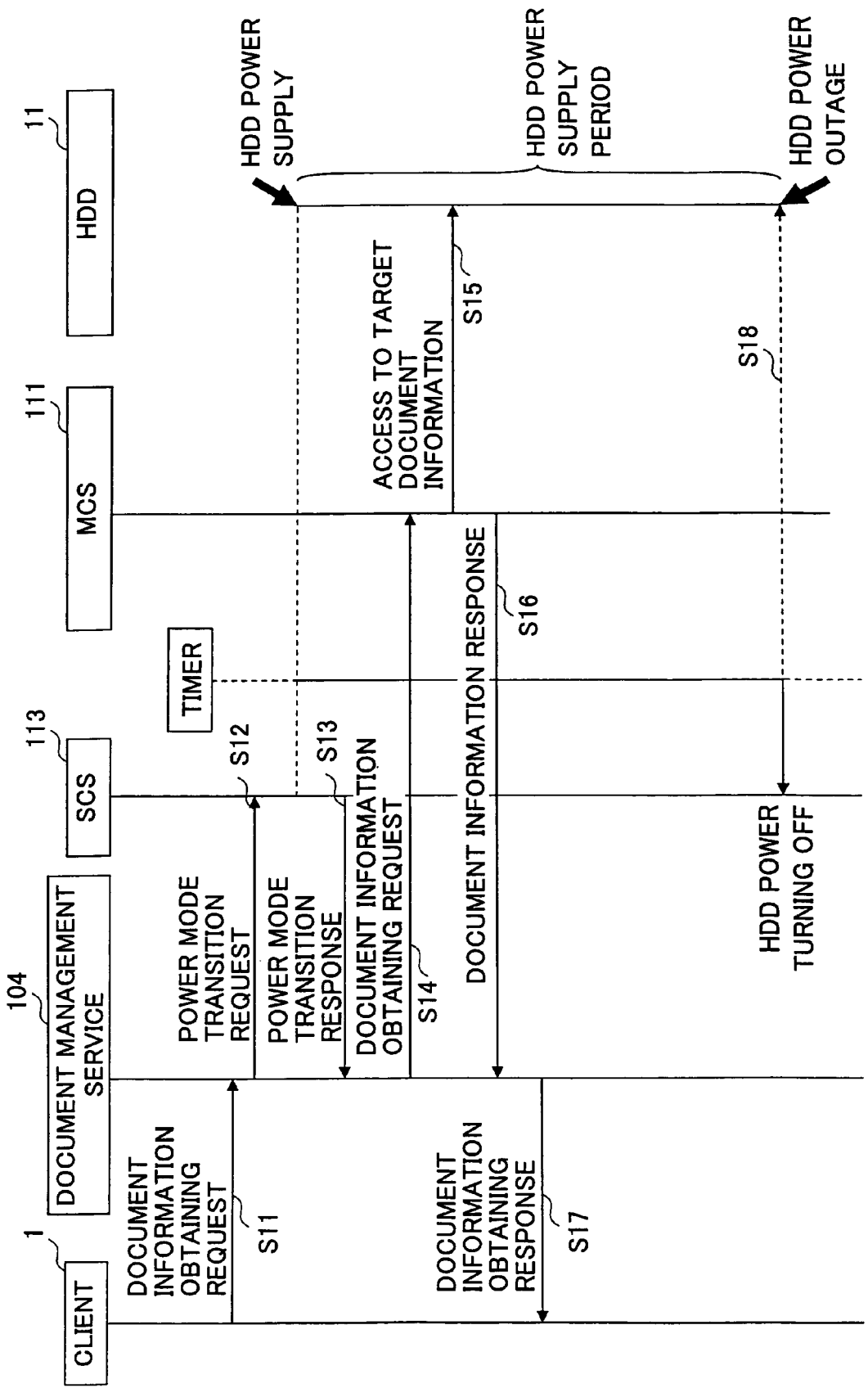
FIG. 5 shows a sequence diagram of processing in which the client obtains document information stored in the commix machine in a level 1 power mode.

FIG. 5 shows a sequence diagram of processing in which the client obtains document information stored in the multifunction machine in the level 1 power mode. In Step S11, the client 1 notifies the document management service 104 of a document information obtaining request. The document management service 104 notifies the SCS 113 of the power mode transition request in Step S12. Here, the power mode thus changes from the level 1 to the level 2. After Step S12, the HDD 11 is provided with operation power. When power supply to the HDD 11 is thus started, the SCS 113 notifies the document management service 104 of a power mode transition response to the power mode transition request of Step S12, in Step S13.

In Step S14, the document management service 104 makes a document information obtaining request from the MCS 111 for designated document information designated by the document information obtaining request of Step S11. The MCS 111 then obtains the designated document information stored in the HDD 11 in Step S15.

In Step S16, the MCS 111 transmits the thus-obtained target document information to the document management service 104 as a response to the document obtaining request of Step S14. In Step S17, the document management service 104 transmits the target document information thus received from the MCS 111, to the client 1 as a response to the document information obtaining request of Step S11. In Step S18, by means of the timer function of the SCS 113, power supply to the HDD 11 is turned off when a set duration has elapsed.

In the sequence diagram of FIG. 5, upon the document information obtaining request, power supply to the HDD 11 for which power supply has been turned off should be turned on again. That is, the multifunction machine having the plurality of power modes repetitively carries out turning on/off of power supply to the respective devices each time when a power mode transition occurs to the ordinary mode or to the power saving mode. Such repetitious turning on/off of power supply to the respective devices may result in consumption of the storage device or increase in the power consumption.

According to the present invention, document information stored in the HDD 11 of the multifunction machine 2 is copied and is stored in another apparatus or device which does not enter a power saving mode. Thereby, without re-starting power supply to the HDD 11 for which power supply has been stopped, the same document information as that stored in the HDD 11 can be thus used. According to the present invention, the number of times of repetitions of turning on/off of power supply to the HDD 11 can be reduced, and thus, power saving in the power mode can be achieved while consumption of the HDD 11 can be avoided.

As an example of the other apparatus to which document information stored in the HDD 11 is copied and is stored, a replication server connectable to the multifunction machine 2 via the communication network 3 may be applied.

Figure 6:
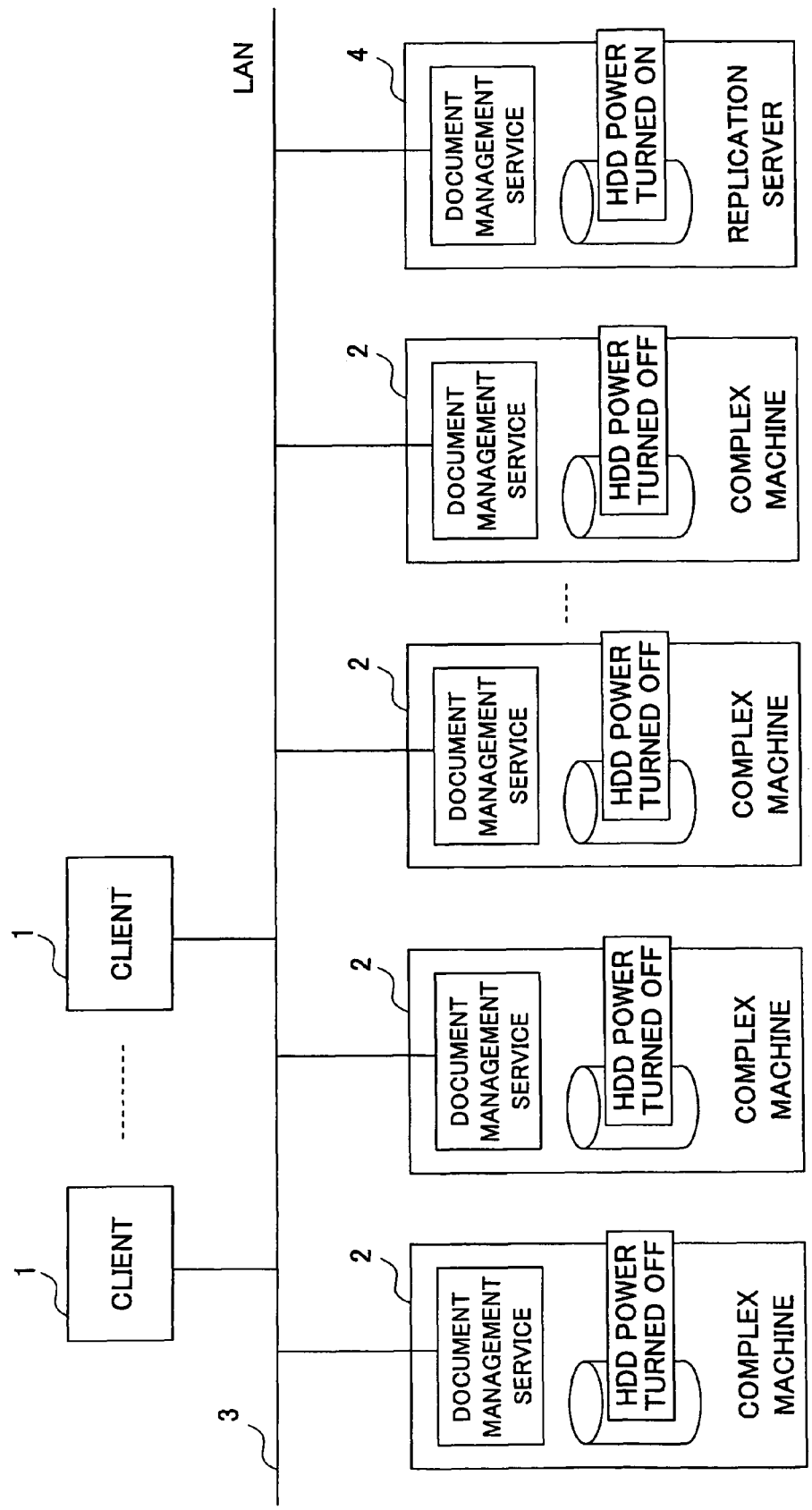
FIG. 6 shows a configuration example of a system having a client and a replication server.

FIG. 6 shows a configuration diagram of one example of a system including the multifunction machine, the client and the replication server. In the system of FIG. 6, at least one client 1, at least one multifunction machine 2 and the replication server 4 are connected together via a communication network 3. The multifunction machines 2 shown have entered the power saving modes. Since the replication server 4 does not have a plurality of power modes, it does not enter a power saving mode. Accordingly, an HDD of the replication server 4 is always provided with operation power.

In the system of FIG. 6, instead of the replication server 4 not entering a power saving mode, the at least one multifunction machine 2 can enter the power saving mode. Accordingly, as the number of the multifunction machines 2 increases, power saving can be achieved more effectively.

Embodiment 1

Figure 7:
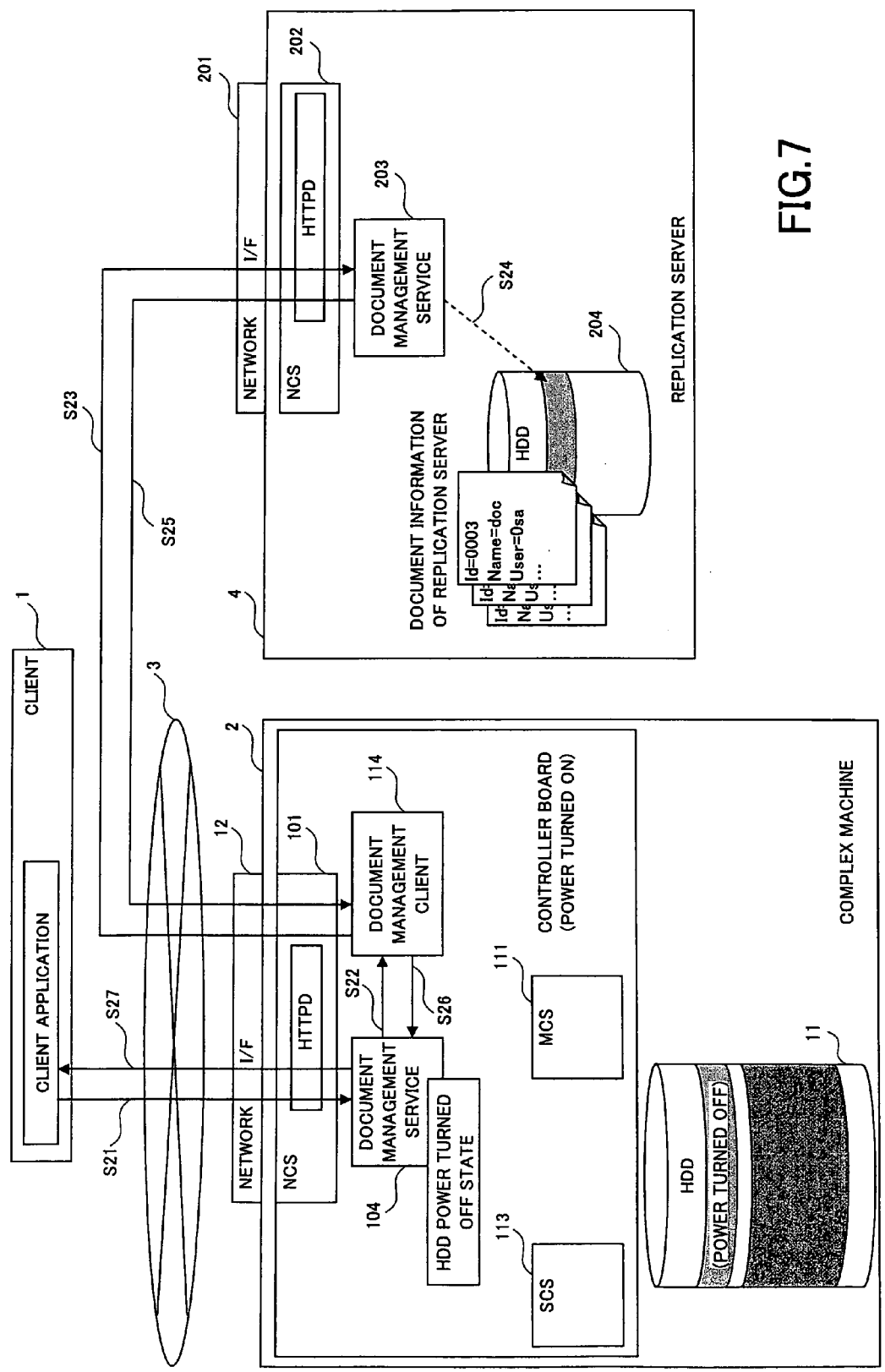
FIG. 7 schematically shows one embodiment of processing in which document information stored in the multifunction machine is referred to from the client.

In FIG. 7, one embodiment of processing is shown in which document information stored in the multifunction machine is referred to by the client. In FIG. 7. a configuration not required for the description is omitted. A user operates the client 1 and requests a reference to document information therefrom. In Step S21, the document information reference request from the client 1 is notified of to the document management service 104 of the multifunction machine 2 via the communication network 3.

The document management service 104 monitors whether or not power is supplied to the HDD 11. The document management service 104 obtains the designated document information from the HDD 11 via the MCS 11 upon receiving the document information reference request when the HDD 11 is provided with operation power, as described above, and transmits the designated document information to the client 1 as a response to the document information reference request of Step 21.

On the other hand, upon receiving the reference request when the HDD 11 is not provided with operation power, the document management server 104 notifies a document management client 114 of the document information reference request in Step S22. The document management client 114 is a module receiving a service provided from the replication server 4.

Then, in Step S23, the document management client 114 notifies a document management service 203 of the replication server 4 of the document information reference request via the communication network 3. Between the document management client 114 and the document management service 203 of the replication server 4, connection is made via the NIC 101, the network I/F 12, the network 3, a network I/F 201 and an NCS 202. The document management service 203 of the replication server 4 is a module managing various sorts of information (including document information) in the replication server 4.

Then, in Step S24, the document management server 203 obtains the designated document information from a HDD 204. In the HDD 204, a copy of the document information stored in the HDD 11 is stored previously. Then in Step S25, the document management service 203 transmits the thus-obtained designated document information to the document management client 114 as a response to the reference request of Step S23. It is noted that the document management service 203 may transmit the designated document information obtained from the HDD 204 as it is, or may transmit the same after processing it in such a data format that it is allowed to be transmitted to the client 1.

Then in Step S26, the document management client 114 transmits the thus-received designated document information to the document management service 104 as a response to the reference request of Step S22. Then in Step S27, the document management service 104 transmits the thus-received designed document information to the client 1 as a response to the reference request of Step S21 via the communication network 3.

In the processing of FIG. 7, as a result of a copy of document information stored in the HDD 11 of the multifunction machine 2 being stored in the replication server which does not enter a power saving mode, the document information the same as that stored in the HDD 11 for which power supply has been turned off can be used without turning on the power supply to the HDD 11.

Figure 8:
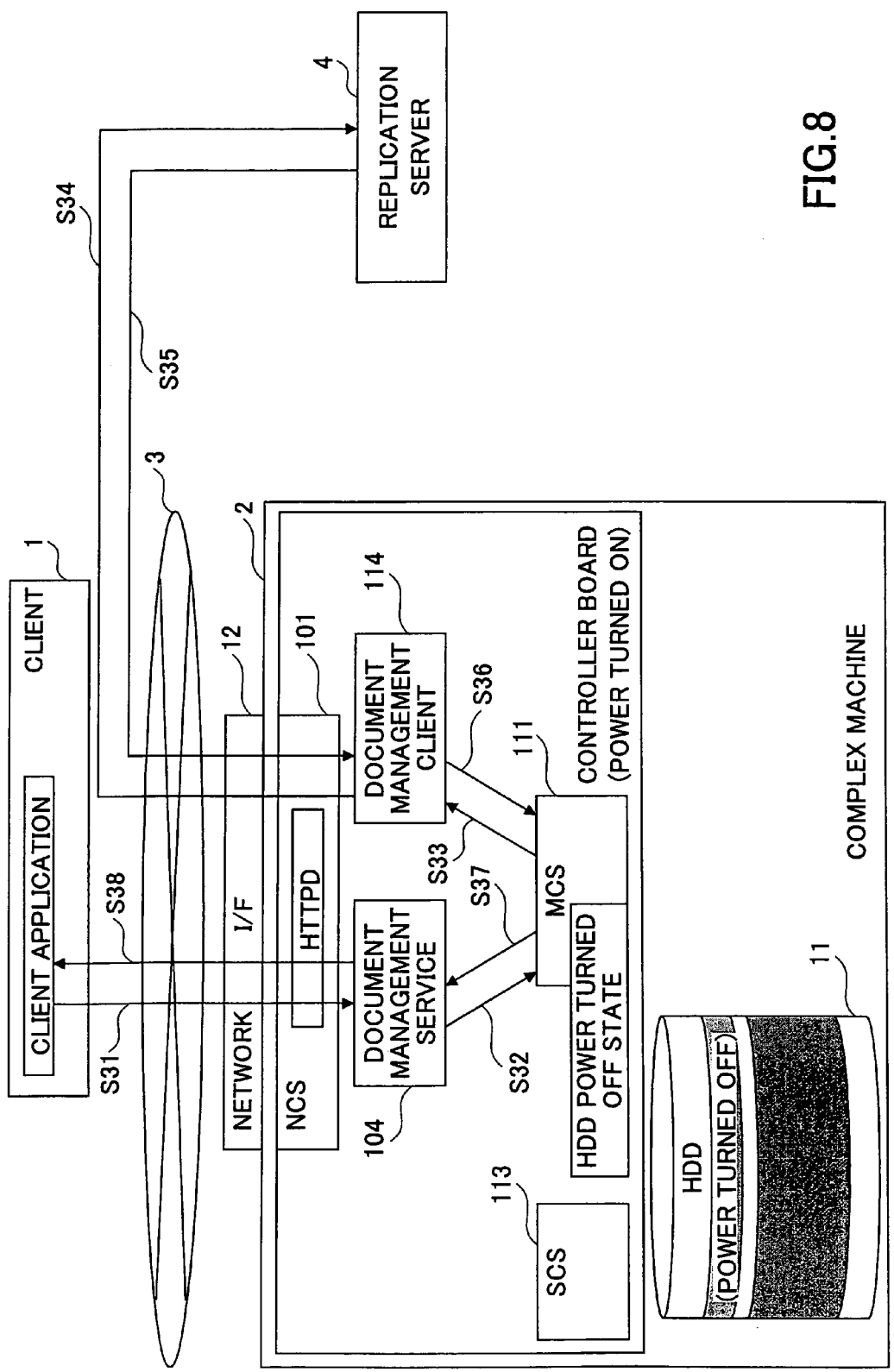
FIG. 8 schematically shows one embodiment of processing in which document information stored in the multifunction machine is referred to from the client.

FIG. 8 schematically shows another embodiment of processing in which document information stored in the multifunction machine is referred to by the client. The diagram of FIG. 8 is the same as that of FIG. 7 except a part, and duplicated description is omitted.

In Step S31, a document information reference request from the client 1 is notified of to the document management service 104 of the multifunction machine 2 via the communication network 3. The document management service 104 notifies the MCS 111 of the designated document information reference request in Step S32. The MCS 111 is monitoring whether or not power is supplied to the HDD 11. The MCS 111 obtains the designated document information from the HDD 11 upon receiving the document information reference request when the HDD 11 is provided with operation power, as described above, and transmits the designated document information to the document management service 104 as a response to the document information reference request of Step S32. The document management service 104 transmits the received designated document information to the client 2 via the communication network 3 as a response to the reference request of Step S31.

On the other hand, upon receiving the reference request when the HDD 11 is not provided with operation power, the MCS 111 notifies the document management client 114 of the document information reference request in Step S33. In Steps 34 and S35, the same as Steps S23 through S25, the document management client 114 obtains the designated document information from the replication server 4.

Then in Step S36, the document management client 114 transmits the thus-received designated document information to the MCS 111 of the multifunction machine 2 as a response to the reference request of Step S33. Then in Step S37, the MCS 111 transmits the thus-received designated document information to the document management service 104 as a response to the reference request of Step S32. The document management service 104 transmits the thus-received designated document information to the client 1 as a response to the reference request of Step S31 via the communication network 3.

In the processing of FIG. 8, as a result of a copy of document information stored in the HDD 11 of the multifunction machine 2 being stored in the replication server which does not enter a power saving mode, the document information the same as that stored in the HDD 11 for which power supply has been turned off can be used without turning on the power supply to the HDD 11.

Figure 9:
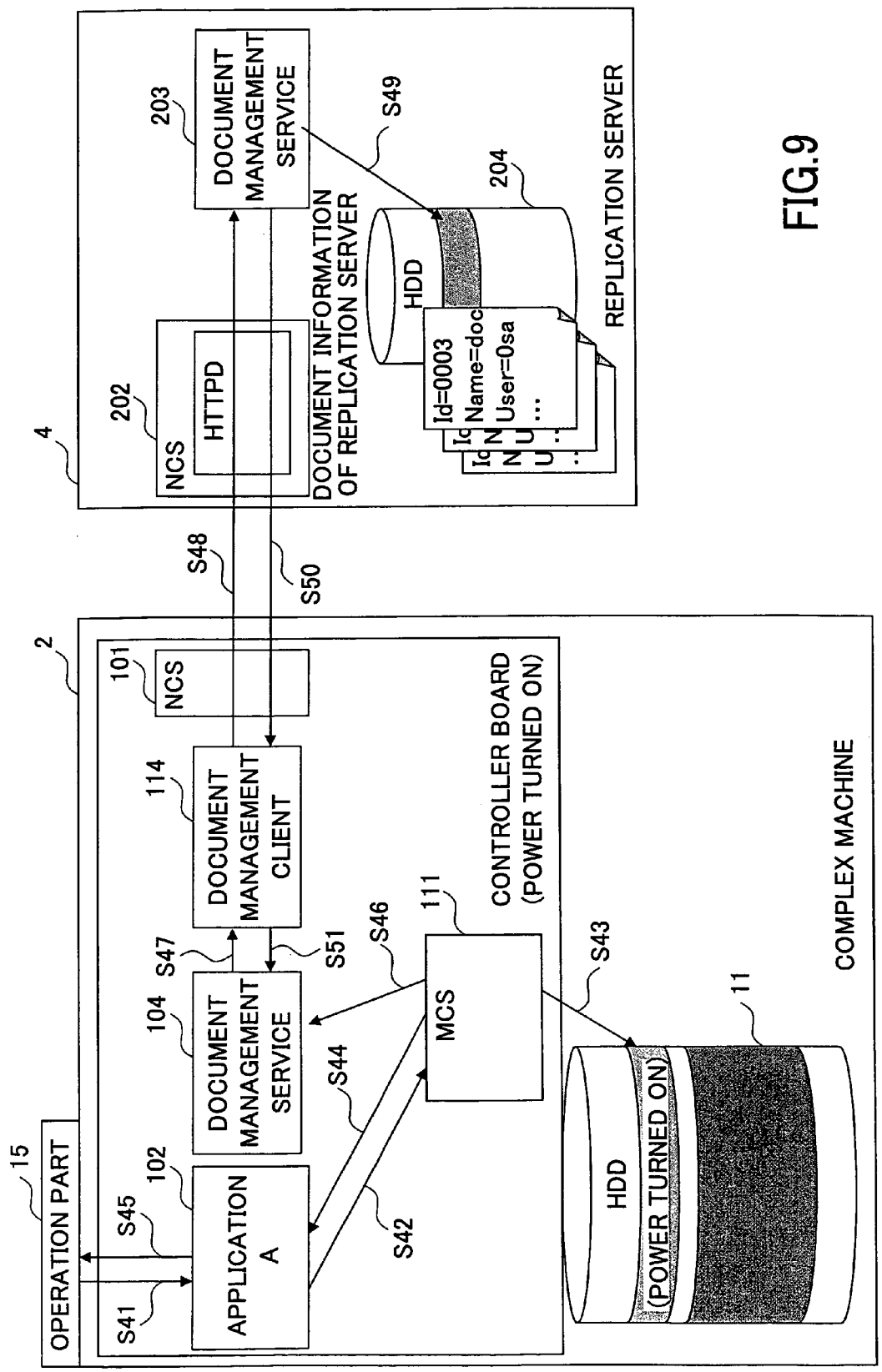
FIG. 9 schematically shows one embodiment of processing in which document information stored in the replication server is updated.

FIG. 9 shows one embodiment of processing in which document information stored in the replication server is updated. When a user carries out document operation on the operation part 15, the operation part 15 notifies the application A 102 of the contents of the document operation, in Step S41. The application A 102 carries out a production or a change of designated document information according to the contents of the document operation.

Then in Step S42, the application A 102 makes a storing request for storing the designated document information in the HDD 11. In Step S43, the MCS 111 stores the designated document information in the HDD 11. In Step S44, the MCS 111 notifies the application A 102 of a storing response to the storing request of Step S42. In Step S45, the application A 102 causes the operation part 15 to make a panel display according to the storing response.

Further, the MCS 111 makes a document information change notification to the document management service 104 in Step S46. In Step S47, the document management service 104 makes a storing request for storing the designated document information in the HDD 204 of the replication server 4 to the document management client 114.

In Step S48, the document management client 114 notifies the document management service 203 of the replication server 4 of the designated document information storing request via the communication network 3. In Step S49, the document management service 203 stores the designated document information in the HDD 204. In Step S50, the document management service 203 transmits a response to the storing request of Step S48 to the document management client 114 of the multifunction machine 2. In Step S51, the document management client 114 transmits a response to the storing request of Step S47 to the document management service 104.

In the processing of FIG. 9, in response to the updated contents of document information stored in the HDD 11 of the multifunction machine 2, document information stored in the HDD 204 of the replication server 4 can be updated accordingly.

Figure 10:
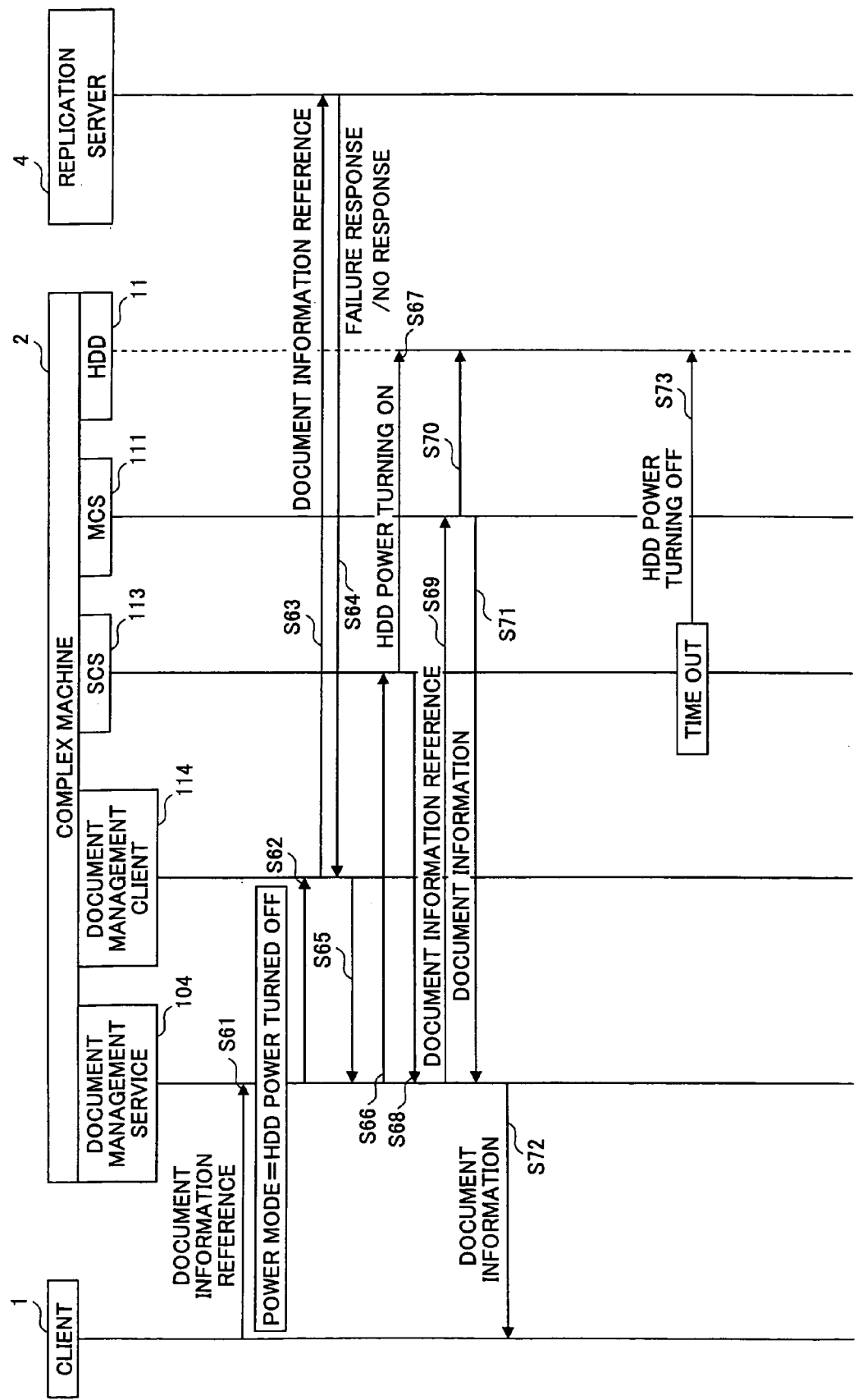
FIG. 10 schematically shows one embodiment of processing in which document information stored in the multifunction machine is referred to from the client.

FIG. 10 shows a sequence diagram of an embodiment of processing in which document information stored in the multifunction machine is referred to from the client. This processing is one carried out when a reference to document information stored in the replication server 4 is failed in.

Processing of Steps S61 through S63 is the same as that of Steps S21 through S23, and duplicated description is omitted. When failing in obtaining of designated document information, the replication server 4 transmits a failure response to the reference request of Step S63, to the document management client 114 of the multifunction machine 2, in Step S64.

Then, in Step S65, the document management client 114 transmits a failure response to the reference request of Step 62 to the document management service 104 when receiving the failure response from the replication server 4 or receiving no response from the replication server 4. Then in Step S66, the document management service 104 notifies the SCS 113 of the power mode transition request. Here, the power mode thus changes from the level 1 to the level 2.

In Step S67, the SCS 113 turns on power supply to the HDD 11. When the power supply to the HDD 11 is thus turned on, the SCS 113 notifies the document management service 104 of a power mode transition response to the power mode transition request of Step S66. Processing of Steps S69 through S72 is the same as that of Steps S2 through S5 of FIG. 1, and duplicated description is omitted. In Step S73, the timer function of the SCS 113 turns off the power supply to the HDD 11 when a set duration has elapsed.

Thus, in the processing of FIG. 10, even when a reference to document information stored in the replication server is failed in, document information stored in the HDD 11 can be used as a result of the power supply to the HDD 11 being turned on Embodiment 2

Figure 11:
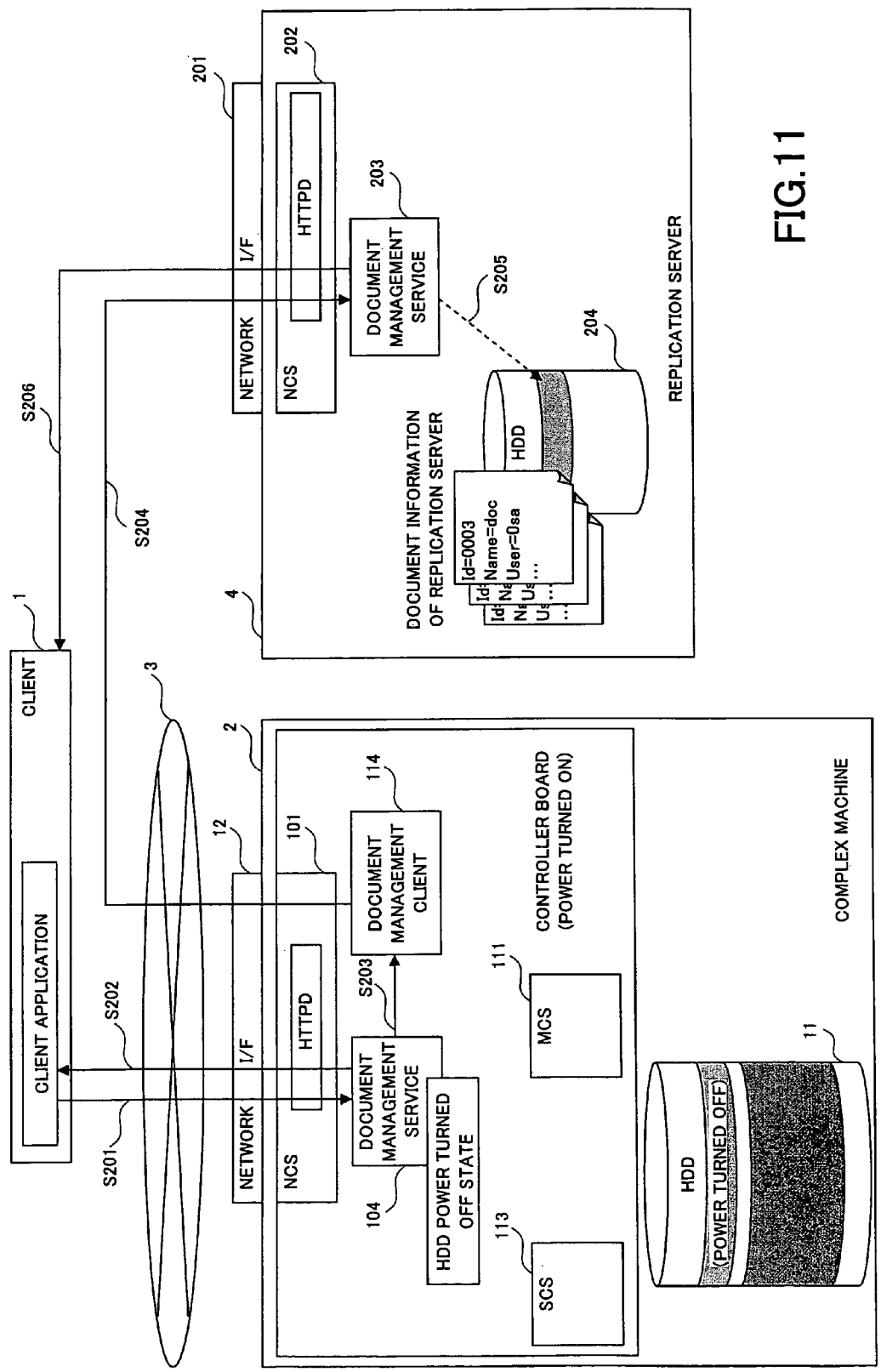
FIG. 11 schematically shows another embodiment of processing in which document information stored in the multifunction machine is referred to from the client.

In the embodiment 1 described above, an example has been described in which the response to the document information reference request notified of from the client 1 is made by the document management service 104. FIG. 11 schematically shows another embodiment of processing in which document information stored in the multifunction machine is referred to from the client 1. Since the diagram of FIG. 11 is the same as that of FIG. 7 except part, duplicated description is omitted appropriately.

A user makes a document information reference request by operating the client 1. In Step S201, the client 1 notifies the document management service 104 of the multifunction machine 2 via the communication network of the document information reference request.

The document management service 104 obtains the designated document information from the HDD 11 via the MCS 111 as described above when the document information reference request is made while the power supply in the HDD 11 has been turned on. Then, the document management service 104 transmits the thus-obtained designated document information to the client 1 as a response to the reference request of Step S201 via the communication network 3.

On the other hand, the document management service 104 transmits a response to the client for notifying it of the matter that the reference request of Step S201 has been received in Step S202 when the document information reference request is received while the power supply in the HDD 11 has been turned off.

Then, in Step S203, the document management service 104 notifies the document management client 114 of the document information reference request. Then, in Step S204, the document management client 114 notifies the document management service 203 of the replication server 4 of the document information reference request via the communication network 3.

Then in Step S205, the document management service 203 obtains the designated document information from the HDD 204 in the replication server 4. In the HDD 204, a copy of the document information stored in the HDD 11 of the multifunction machine 1 is previously stored. Then, in Step S206, the document management service 203 transmits the thus-obtained designated document information to the client 1 via the communication network 3 as a response to the document information reference request of Step S201.

In the processing of FIG. 11, by previously storing the copy of the document information stored in the HDD 11 of the multifunction machine 2 in the replication server 4 which does not enter a power saving mode, the document information the same as that stored in the HDD 11 can be used without turning on the power supply in the HDD 11 for which the power supply has been turned off.

Figure 12:
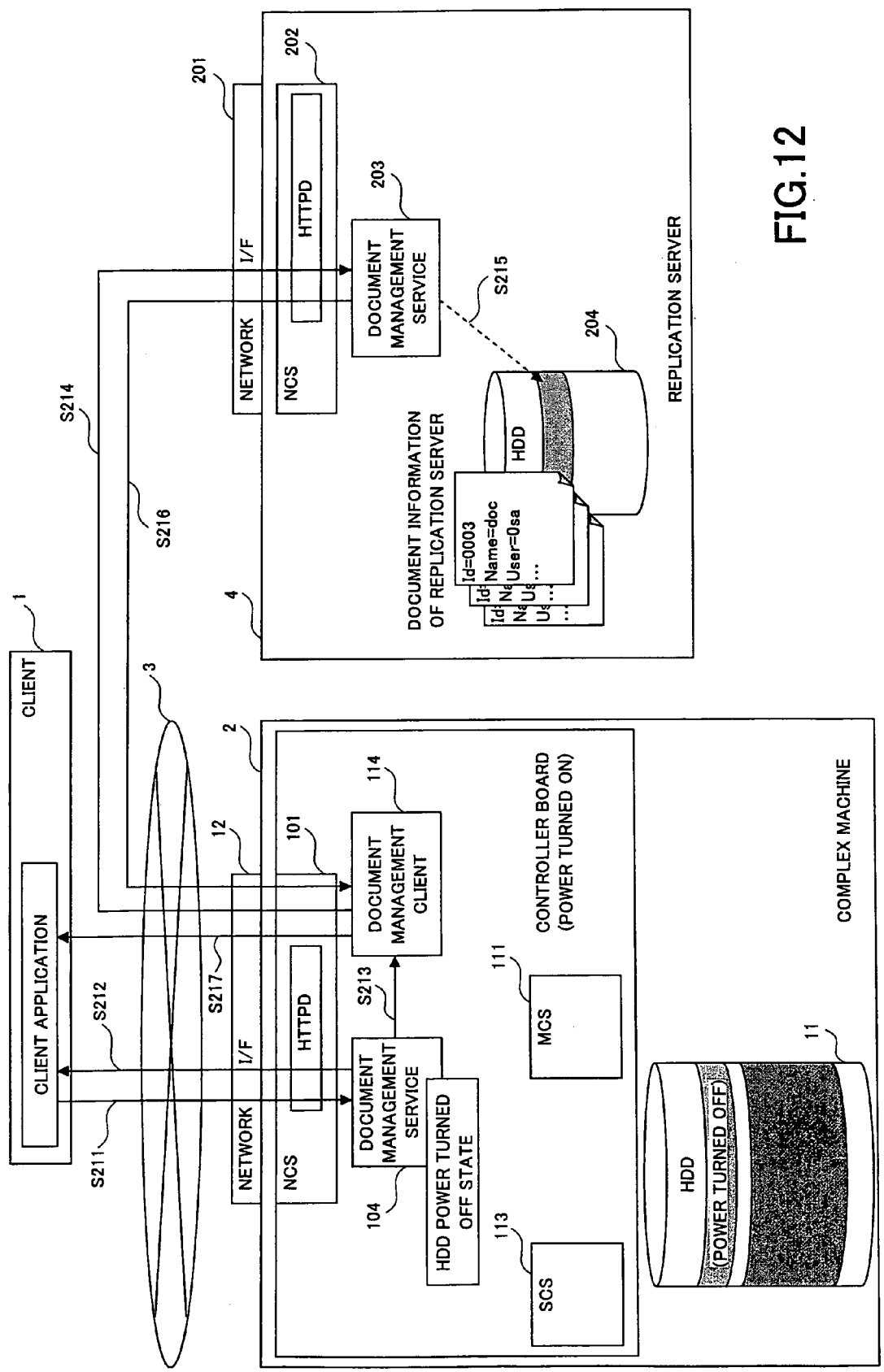
FIG. 12 schematically shows another embodiment of processing in which document information stored in the multifunction machine is referred to from the client.

FIG. 12 schematically shows further another embodiment of processing in which document information stored in the multifunction machine is referred to from the client 1. Since the diagram of FIG. 11 is the same as that of FIG. 7 except part, duplicated description is omitted appropriately.

Processing in Steps S211 through S215 is the same as that in Steps S201 through S205 of FIG. 11, and duplicated description is omitted. Then, in Step S216, the document management service 203 transmits the thus-obtained designated document information to the document management client 114 of the multifunction machine 2 as a response to the reference request of Step S214. The document management service 203 may transmit the designated document information obtained from the HDD 204 as it is, or the document management service 203 may transmit the same after processing it in such a data format that it is allowed to be transmitted to the client 1.

Then in Step S217, the document management client 114 transmits the thus-received designated document information to the client 1 via the communication network 3 as a response to the reference request of Step S211.

In the processing of FIG. 12, by previously storing the copy of the document information stored in the HDD 11 of the multifunction machine 2 in the replication server 4 which does not enter a power saving mode, the document information the same as that stored in the HDD 11 can be used without turning on the power supply in the HDD 11 for which the power supply has been turned off.

In the processing of FIG. 11 or 12 described above, the document management service 203 may transmit the designated document information obtained from the HDD 204 as it is, or the document management service 203 may transmit the same after processing it in such a data format that it is allowed to be transmitted to the client 1. For example, the document management service 203 may carry out processing different according to whether or not the designated document information obtained from the HDD 204 is bibliographic information or image data, as shown in FIG. 13.

Figure 13:
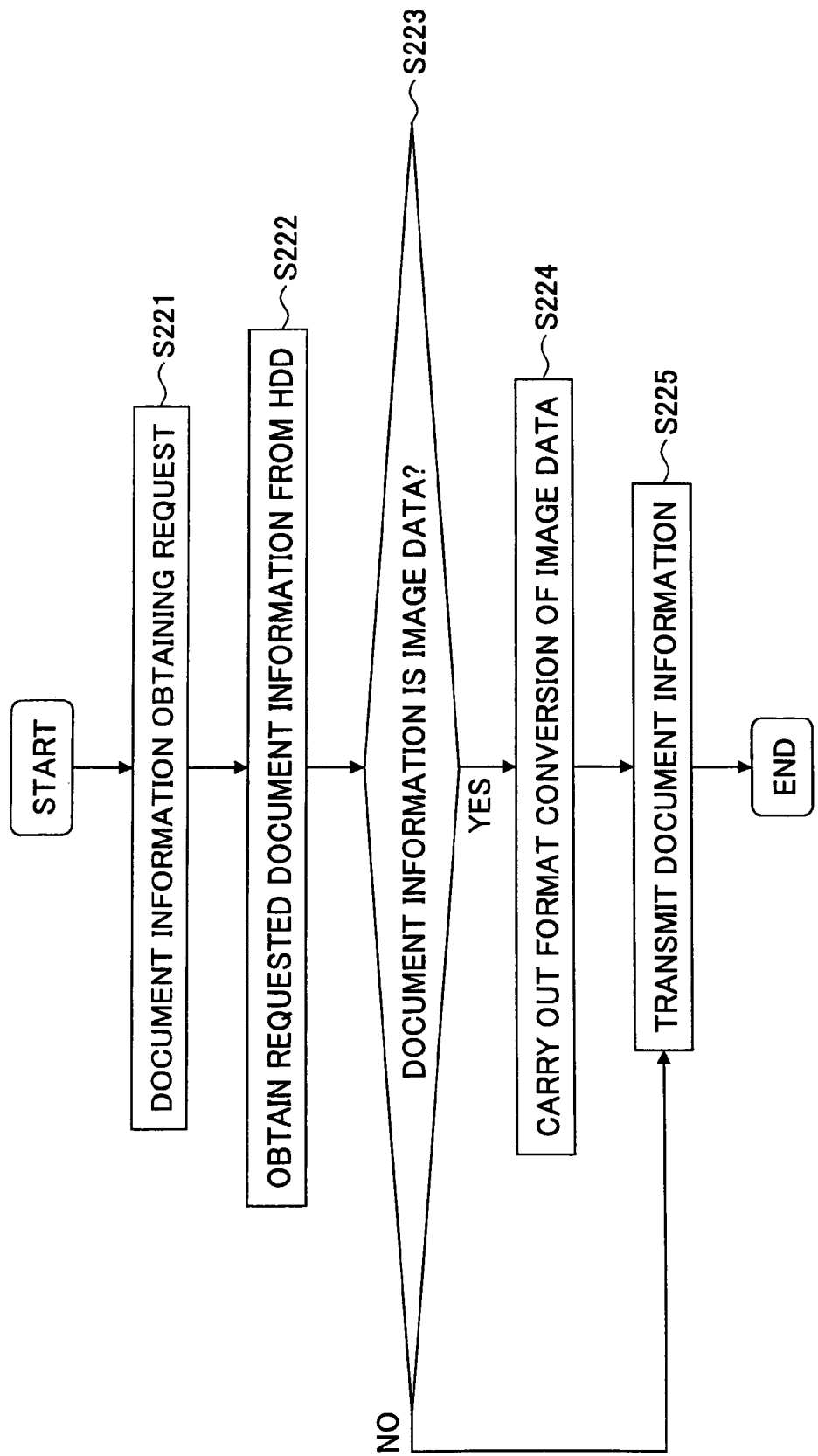
FIG. 13 shows a flow chart illustrating processing of the document management service 203.

FIG. 13 shows a flow chart of processing carried out by the document management service 203. In Step S221, the document management service 203 is notified a document information obtaining request from the document management client 114.

Then, in Step S222, the document management service 203 obtains the designated document information from the HDD 204. Then, in Step S223, the document management service 203 determines whether or not the designated document information obtained from the HDD 204 is image data.

When the designated document information is image data (Yes in Step S223), the document management service 203 carries out format conversion on the image data in Step S224, and then, it carries out Step S225. On the other hand, when the designated document information is not image data (No in Step S223), the document management service 203 directly carries out Step S225. In Step S225, the document management service 203 transmits the document information other than image data, i.e., bibliographic information as it is, or the image data for which the format conversion has been carried out in Step S224 as the document information. The format conversion of Step S224 is one example of processing, and any other processing may be carried out there instead.

In the processing of FIG. 13, different processing can be carried out depending on a particular type of the designated document information obtained from the HDD 204.

Embodiment 3

As another example in which document information stored in the HDD 11 of the multifunction machine 2 is copied and stored, a memory area in the controller board 10 may be applied. As an embodiment 2, document information stored in the HDD 11 of the multifunction machine 2 is copied and is cached in the memory area provided on the controller board 10, and also, the same information is stored in the HDD 204 of the replication server 4.

Figure 14:
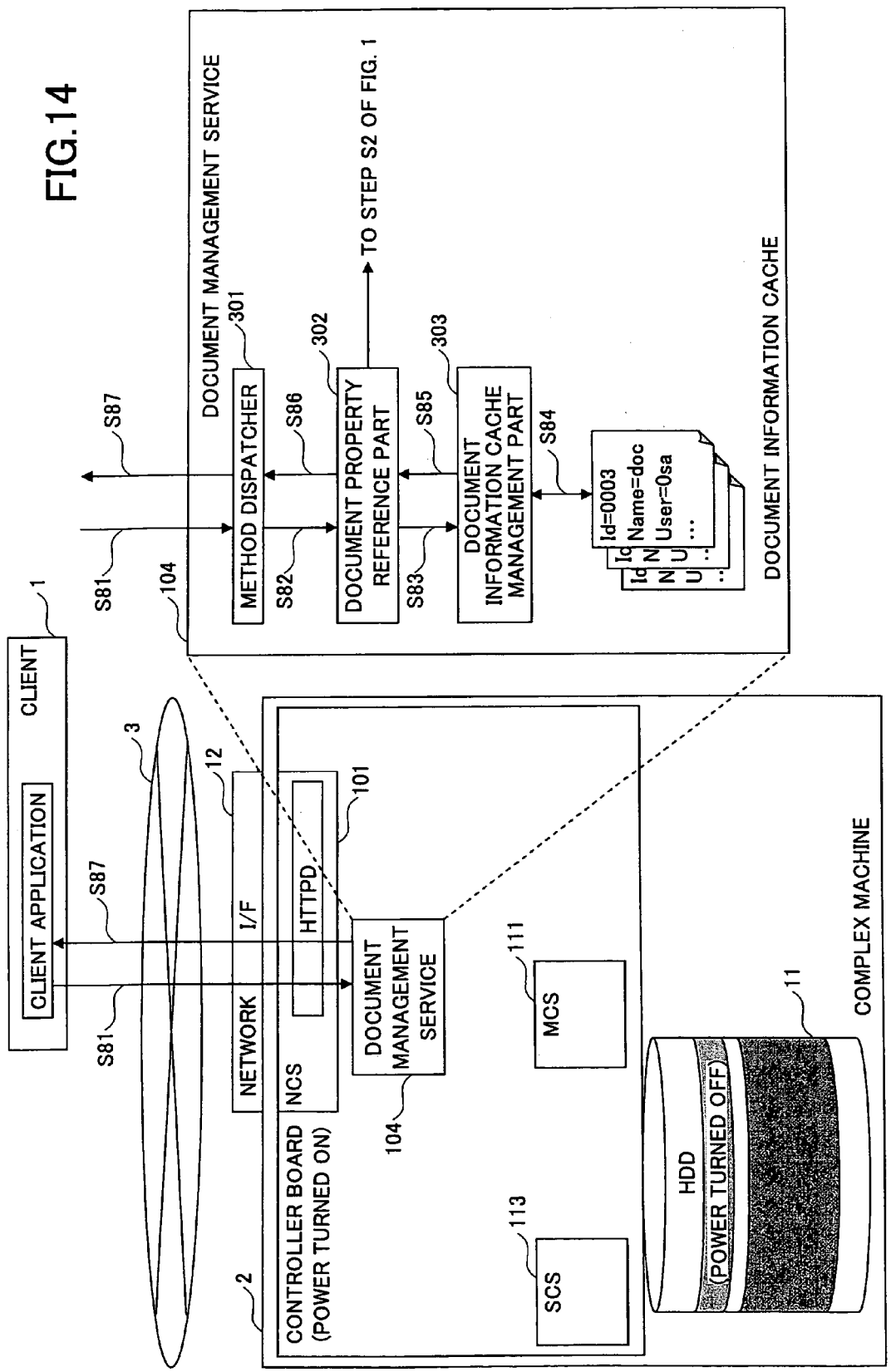
FIG. 14 shows a sequence diagram of one embodiment of processing in which document information stored in the multifunction machine is referred to from the client.

FIG. 14 schematically shows one embodiment of processing in which document information stored in the multifunction machine 2 is referred to by the client. FIG. 14 shows an example in which document information cached in the memory area of the controller board 10 is referred to.

In Step S81, a document information reference request is notified of to the document management service 104 of the multifunction machine 2 via the communication network 3 from the client 1. A method dispatcher 301 of the document management service 104 dispatches the document reference request of Step S81 and notifies a document property reference part 302 of the document reference request, in Step S82.

Then, in Step S83, the document property reference part 302 notifies a document information cache management part 303 of the document information reference request. Then, in Step S84, the document information cache management part 303 obtains the designated document information from the memory area of the controller board 10 if it exists there.

Then, in Step S85, the document information cache management part 303 transmits the thus-obtained designated document information to the document property reference part 302. It is noted that the document information cache management part 303 notifies the document property reference part 302 that the designated document information does not exist in the memory area of the controller board 10 when it does not exist there. The document property reference part 302 makes the designated document information obtaining request to the MCS 111 in Step S2 of FIG. 1, for example, when the designated document information does not exist in the memory area of the controller board 10.

Then, in Step S86, the document property reference part 302 transmits the received designated document information to the method dispatcher 301. Then, in Step S87, the method dispatcher 301 of the document management service 140 transmits the received designated document information to the client 1 via the network 3 as a response to the document information reference request of Step S81.

Figure 15:
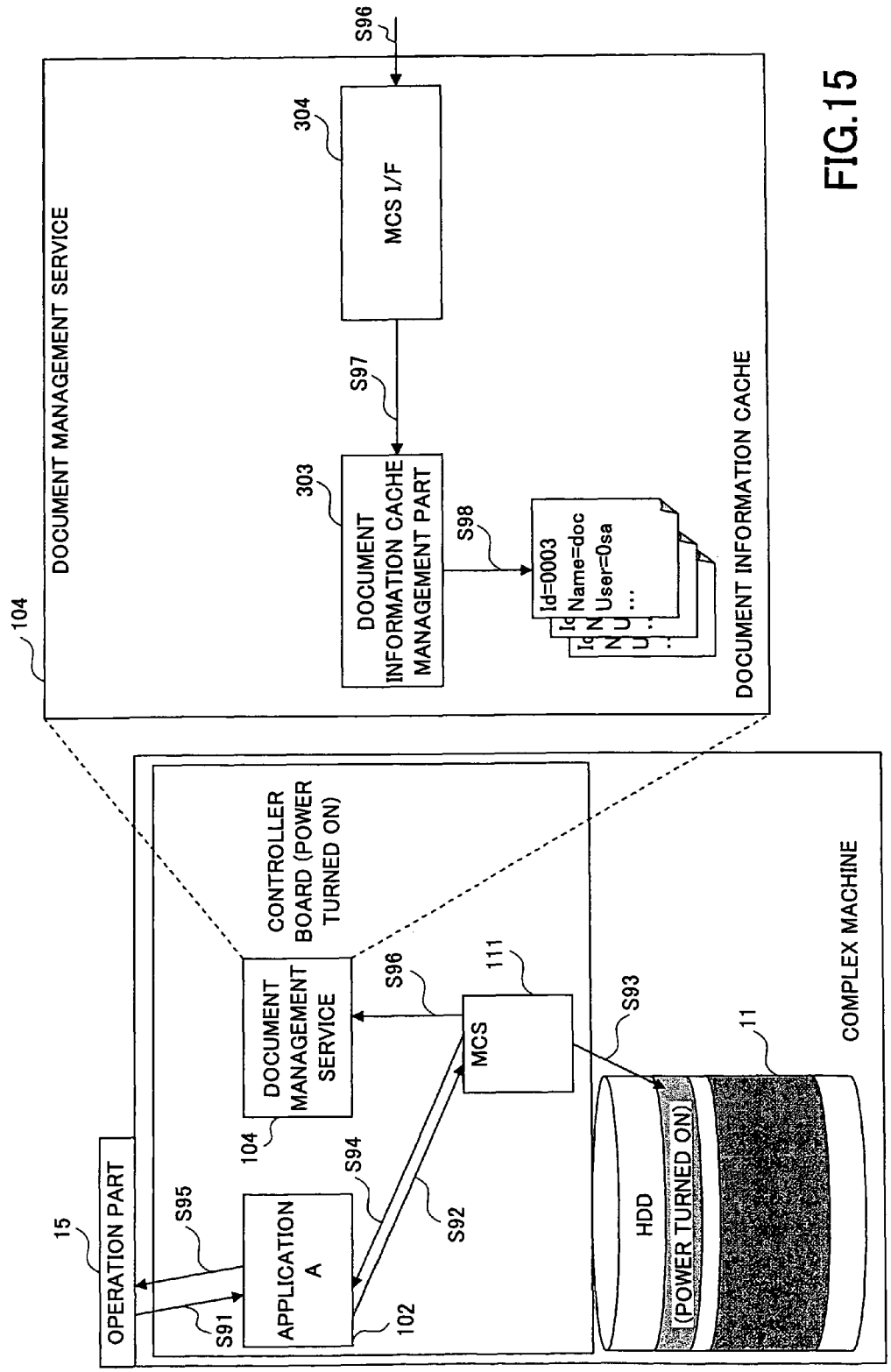
FIG. 15 schematically shows one embodiment of processing in which document information cached in a memory area is updated.

FIG. 15 schematically shows one embodiment of processing in which document information cached in the memory area is updated. Processing of Steps S91 through S95 is the same as the processing of Steps S41 through S45 of FIG. 9, and duplicated description is omitted.

The MCS 111 notifies the document management service 104 of a document information change in Step S96. Upon receiving the document information change notification of Step S96, an MCS I/F 304 of the document management service 104 make a designated document information cache request to the document information cache management part 303 in Step S97. Then, in Step S98, the document information cache management part 303 caches the designated document information in the memory area.

By the processing of FIG. 15, the document information cached in the memory area of the controller board 10 can be updated according to the updated contents of the document information stored in the HDD 11 of the multifunction machine 2.

Figure 16:
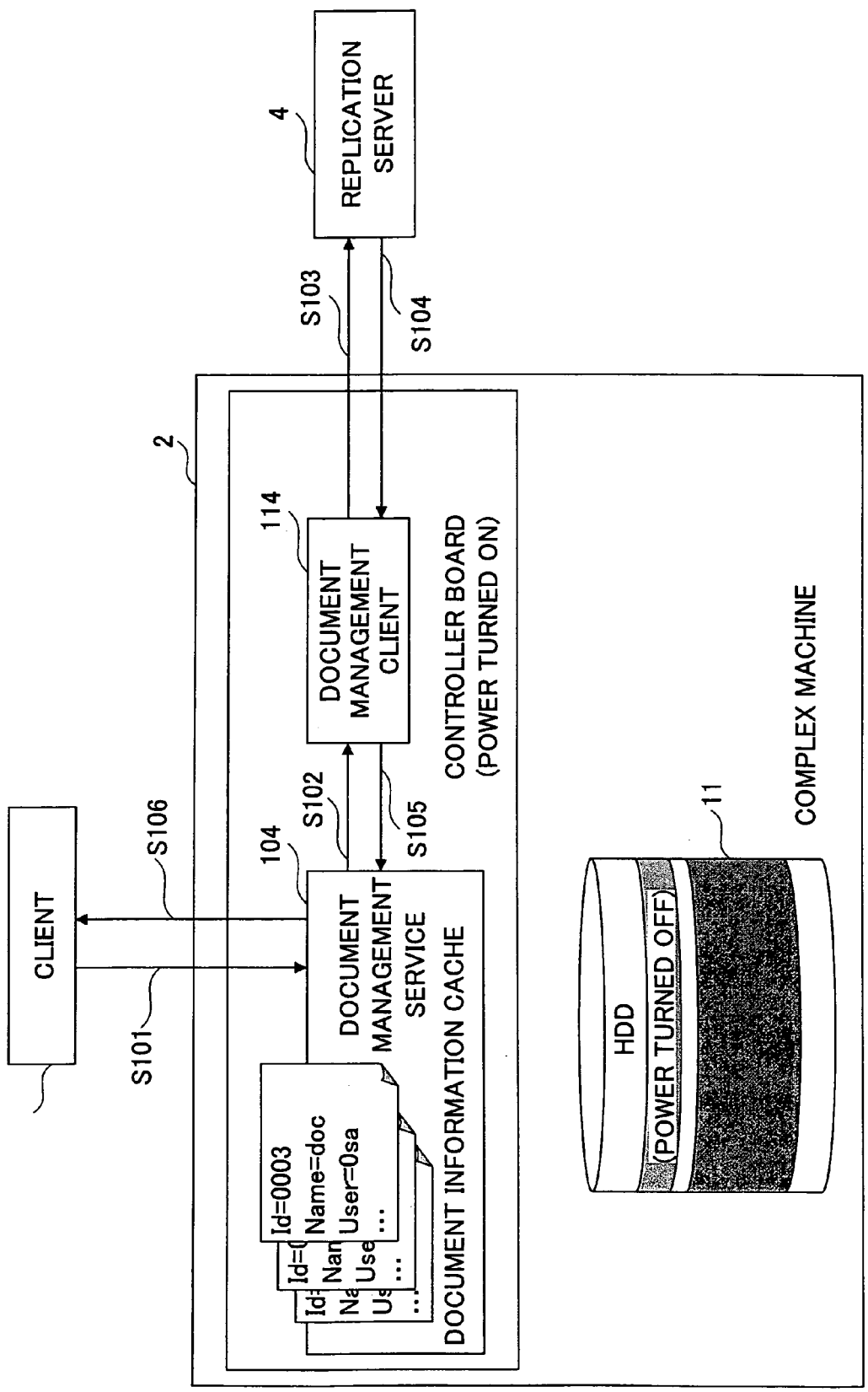
FIG. 16 schematically shows one embodiment of processing in which document information stored in the multifunction machine is referred to from the client.

FIG. 16 schematically shows one embodiment of processing in which document information stored in the multifunction machine 2 is referred to by the client. FIG. 16 shows an example in which document information cached in the memory area of the controller board 10 or the document information stored in the replication server 4 is referred to.

In Step S101, a document information reference request is notified of to the document management service 104 of the multifunction machine 2 via the communication network 3 from the client 1. The document management service 104 determines, as described above, whether or not the designated document information is cached in the memory area of the controller 10. When it is cached, the document management service 104 transmits the designated document information therefrom to the client 1 as a response to the document reference request of Step S101, in Step S106.

On the other hand, when the designated document information is not cached, the document management service 104 notifies the document management client 114 of the document information reference request, in Step S102. In Steps S103 and S104, the document management client 114 obtains the designated document information from the replication server 4 the same as in Steps S23 through S25 of FIG. 7.

Then, in Step S105, the document management client 114 transmits the thus-received designated document information to the document management service 104 as a response to the reference request of Step S102. The document management service 104 transmits the thus-received designated document information to the client 1 as a response to the reference request of Step S101, in Step S106.

It is noted that, for a case where document information is thus cached in the memory area of the controller 10, the available memory area is limited in terms of a limitation of a resource. That is, the number of sets of cacheable document information is limited. In FIG. 15, document information cached in the memory area is updated in timing in which document information change notification is made by the MCS 111. However, the following processing is carried out when the number of sets of cached document information has reached the limitation.

That is, for example, as first processing, the document management service 104 deletes a cache of designated document information only when a document information change notification indicates a deletion of the document information. On the other hand, when the document change notification indicates a newly production of document information or updating of document information, the relevant cache is not operated.

As second processing for another example, the document management service 104 deletes a cache of document information which was updated earliest, when designated document information has not been cached yet, and the designed document information is newly cached. Further, as second processing for further another example, the document management service 104 deletes a cache of document information which was referred to earliest, when designated document information has not been cached yet, and the designed document information is newly cached.

Figure 17:
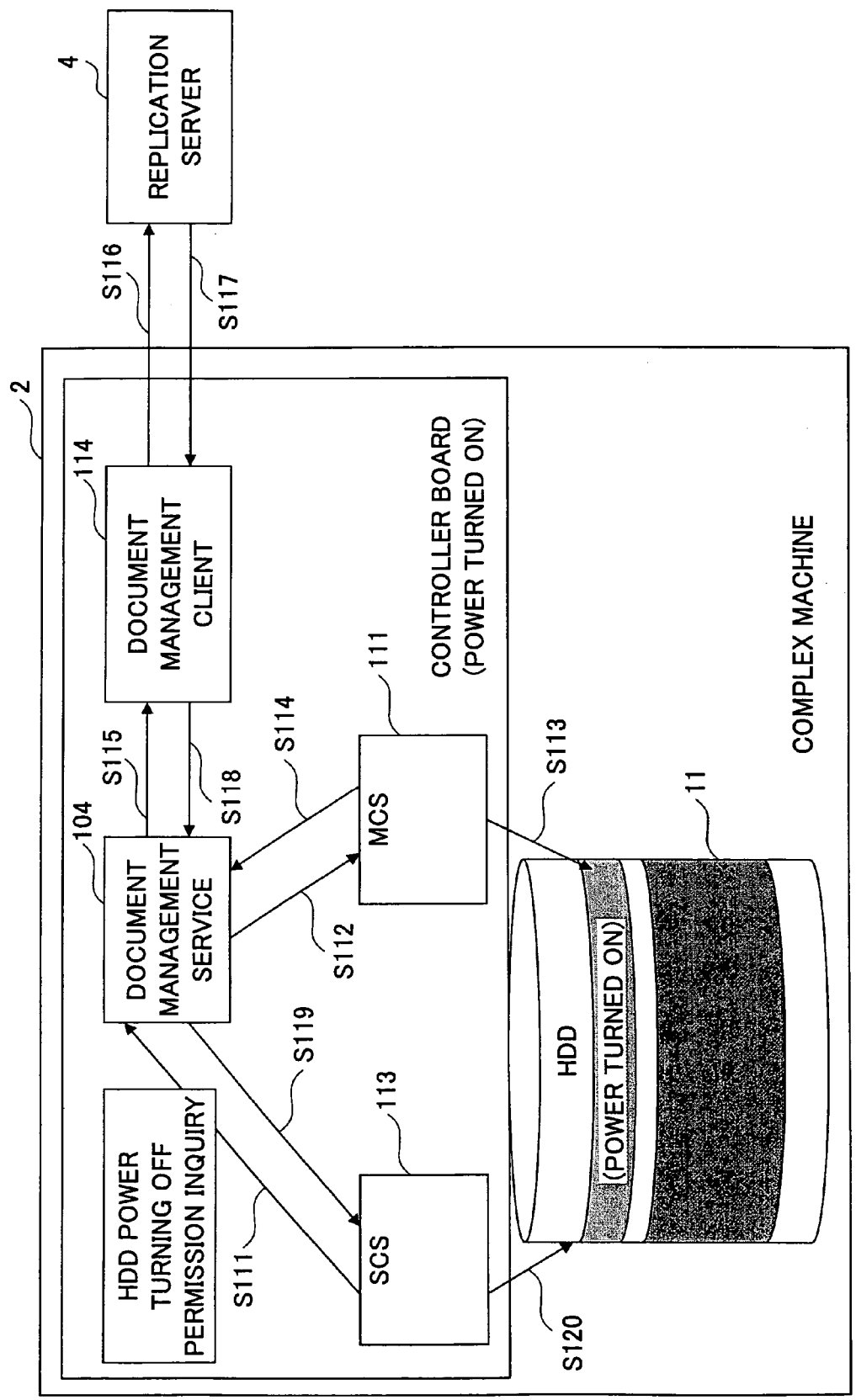
FIG. 17 schematically shows one embodiment of processing in which document information stored in the replication server is updated.

FIG. 17 shows one embodiment of processing in which document information stored in the replication server is updated. FIG. 17 shows an example in which all the document information is updated immediately before the power supply to the HDD is turned off. In Step S111, the SCS 113 makes the HDD 11 power turning off permission inquiry to the document management service 104.

Then, in Step S112, the document management service 104 makes the all document information obtaining request to the MCS 111. Then, in Step S113, the MCS 111 obtains all the document information from the HDD 11. Then, in Step S114, the MCS 111 transmits the thus-obtained all document information to the document management service 104 as a response to the obtaining request of Step S112. Then, in Step S115, the document management service 104 makes a request to the document management client 114 for storing the thus-received all document information.

Then, in Step S116, the document management client 114 notifies the replication server 4 of the all document information storing request via the communication network 2. The replication server 4 stores all the document information. Then, in Step S117, the replication server 4 transmits a response to the storing request of Step S116 to the document management client of the multifunction machine 2.

Then in Step S118, the document management client 114 transmits a response to the storing request of Step S115 to the document management service 104. Then in Step S119, the document management service 104 transmits the HDD 11 power turning off permission inquiry response to the SCS 113. Then in Step S120, the SCS 113 turns off the power supply to the HDD 11.

In the processing of FIG. 17, all the document information stored in the HDD 11 of the multifunction machine 2 can be stored in the replication server 4 immediately before the HDD power turning off occasion.

Figure 18:
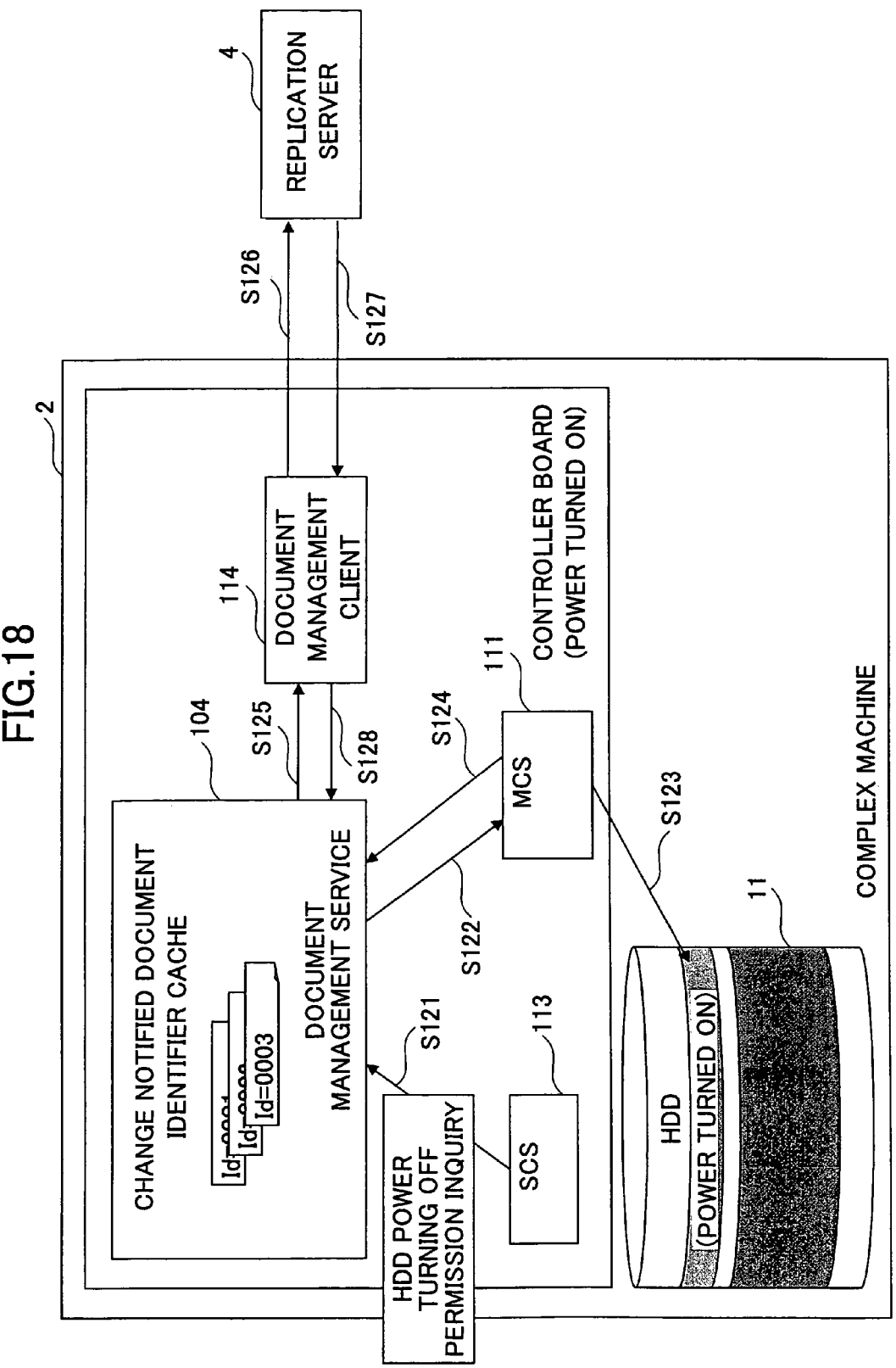
FIG. 18 schematically shows one embodiment of processing in which document information stored in the replication server is updated.

FIG. 18 shows another embodiment of processing in which document information stored in the replication server is updated. FIG. 18 shows an example in which document information for which a document information change notification is made is updated immediately before the power supply to the HDD is turned off.

In Step S121, the SCS 113 makes the HDD 11 power turning off permission inquiry to the document management service 104. Then, in Step S112, upon receiving document information change notification from the MCS 111 as described above, the document management service 104 caches a document ID of the document information corresponding to the document information change notification.

In Step S122, the document information management service 104 makes an obtaining request for the document information corresponding to the cached document ID to the MCS 111. Then, in Step S123, the MCS 111 obtains the document information corresponding to the document ID from the HDD 11. Then, in Step S124, the MCS 111 transmits the thus-obtained document information corresponding to the document ID to the document management service 104 as a response to the obtaining request of Step S122. Then, in Step S125, the document management service 104 makes a request to the document management client 114 for storing the thus-received document information.

Then, in Step S126, the document management client 114 notifies the replication server 4 of the document information storing request via the communication network 3. The replication server 4 stores the thus-received document information. Then, in Step S127, the replication server 4 transmits a response to the storing request of Step S126 to the document management client 114 of the multifunction machine 2.

Then in Step S128, the document management client 114 transmits a response to the storing request of Step S125 to the document management service 104. After that, the same as Steps S19 and S120, the document management service 104 transmits the HDD 11 power turning off permission inquiry response to the SCS 113, and the SCS 113b turns off the power supply of the HDD 11.

In the processing of FIG. 18, the part of the document information stored in the HDD 11 of the multifunction machine 2, which part of the document information is one for which the document information change notification is made can be stored in the replication server 4 immediately before the HDD power turning off occasion.

Figure 19:
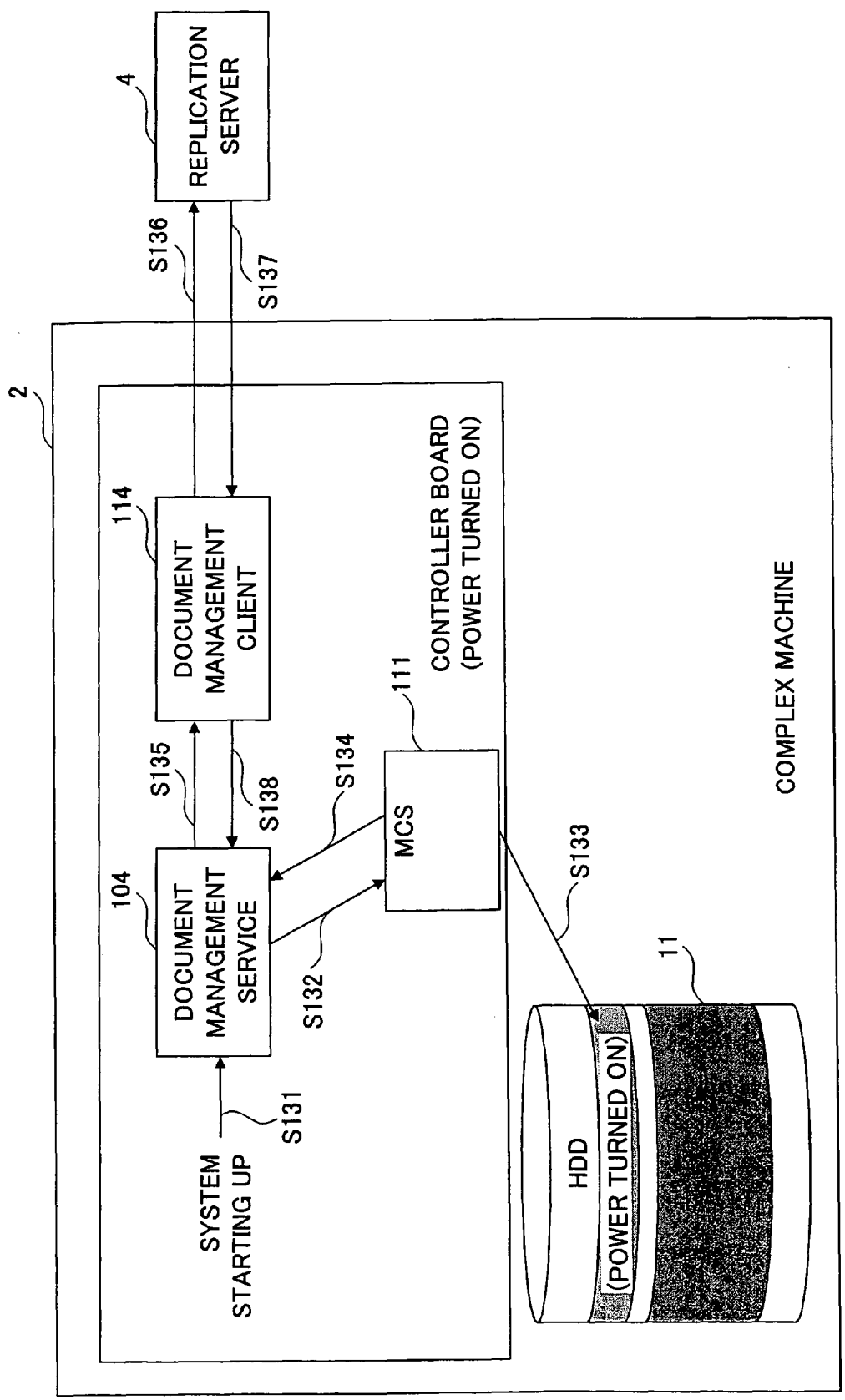
FIG. 19 schematically shows one embodiment of processing in which document information stored in the replication server is updated.

FIG. 19 shows further another embodiment of processing in which document information stored in the replication server is updated. FIG. 19 shows an example in which all the document information is updated when the multifunction machined 2 is started up.

In Step S131, the system of the multifunction machine 2 is started up. In Steps S132 through S134, the document management service 104 obtains all the document information the same as in Steps S112 through S114 of FIG. 17. Further, in Steps S135 through S138, the document management service 104 stores all the document information in the replication server 4 the same as in Steps S115 through S118 of FIG. 17.

In the processing of FIG. 19, all the document information stored in the HDD 11 of the multifunction machine 2 can be stored in the replication server 4 when the multifunction machine 2 is started up.

Embodiment 4

Figure 20:
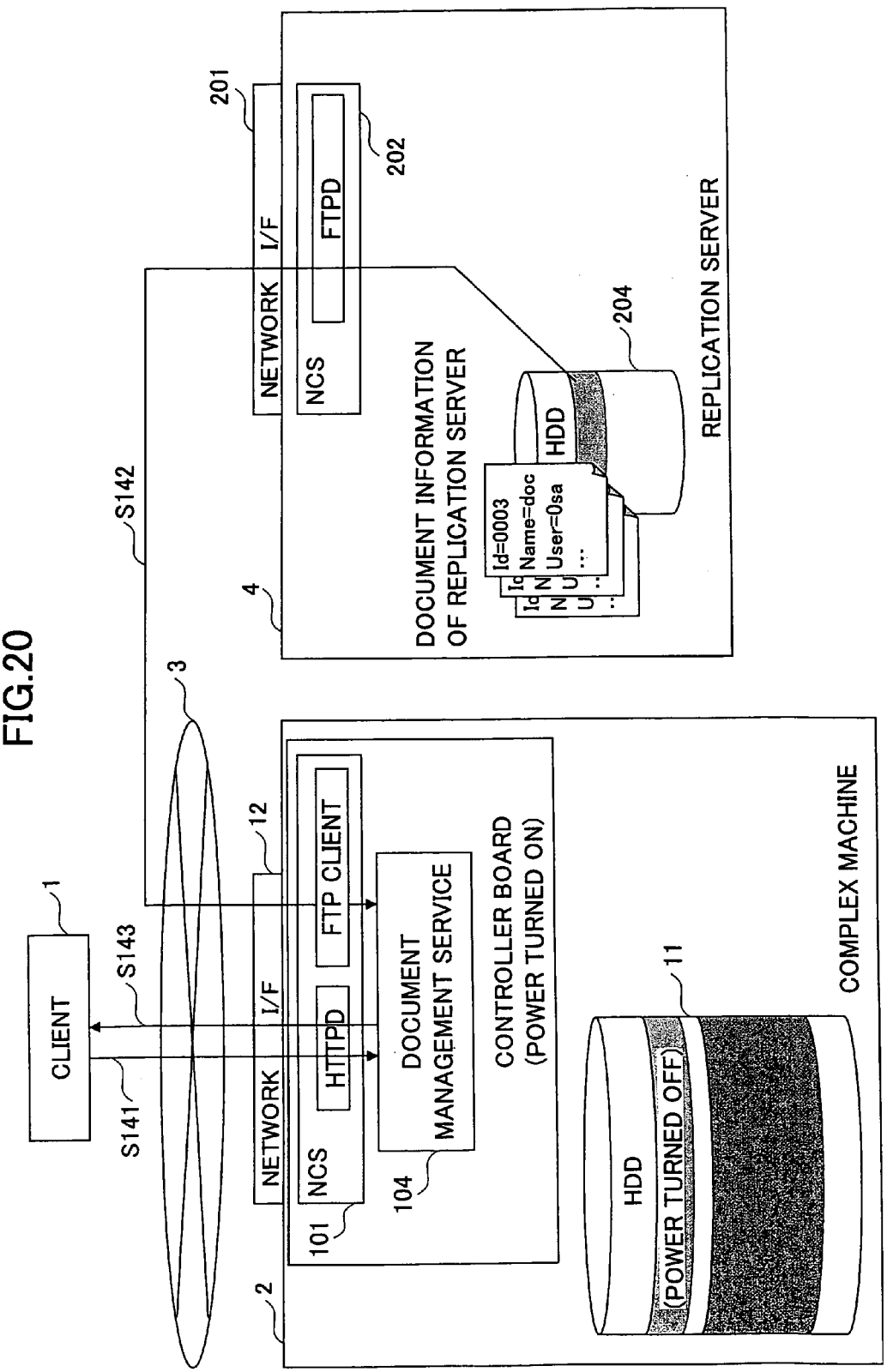
FIG. 20 schematically shows one embodiment in which document information stored in the multifunction machine is referred to from the client.

FIG. 20 shows one embodiment of processing in which document information stored in the multifunction machine is referred to by the client. FIG. 20 shows an example in which an FTP is applied, and document information stored in the replication server 4 is obtained therewith.

In Step S141, a document information reference request from the client is notified of to the document management service 104 of the multifunction machine 2 via the communication network 3. The document management service 104 obtains the designated document information from the HDD 204 of the replication server 4 in Step S142 when the document information reference request is received while the power supply to the HDD 11 is turned off. In Step S142, an FTP client included in the NCS 101 is applied.

Then, in Step S143, the document management service 104 transmits the thus-obtained designated document information to the client 1 as a response to the reference request of Step S141, via the communication network 3.

In the processing of FIG. 20, a copy of the document information stored in the HDD 11 of the multifunction machine 2 is previously stored in the replication server 4 which does not enter a power saving mode, and the document information can be obtained with the use of the FTP from the replication server 4.

Figure 21:
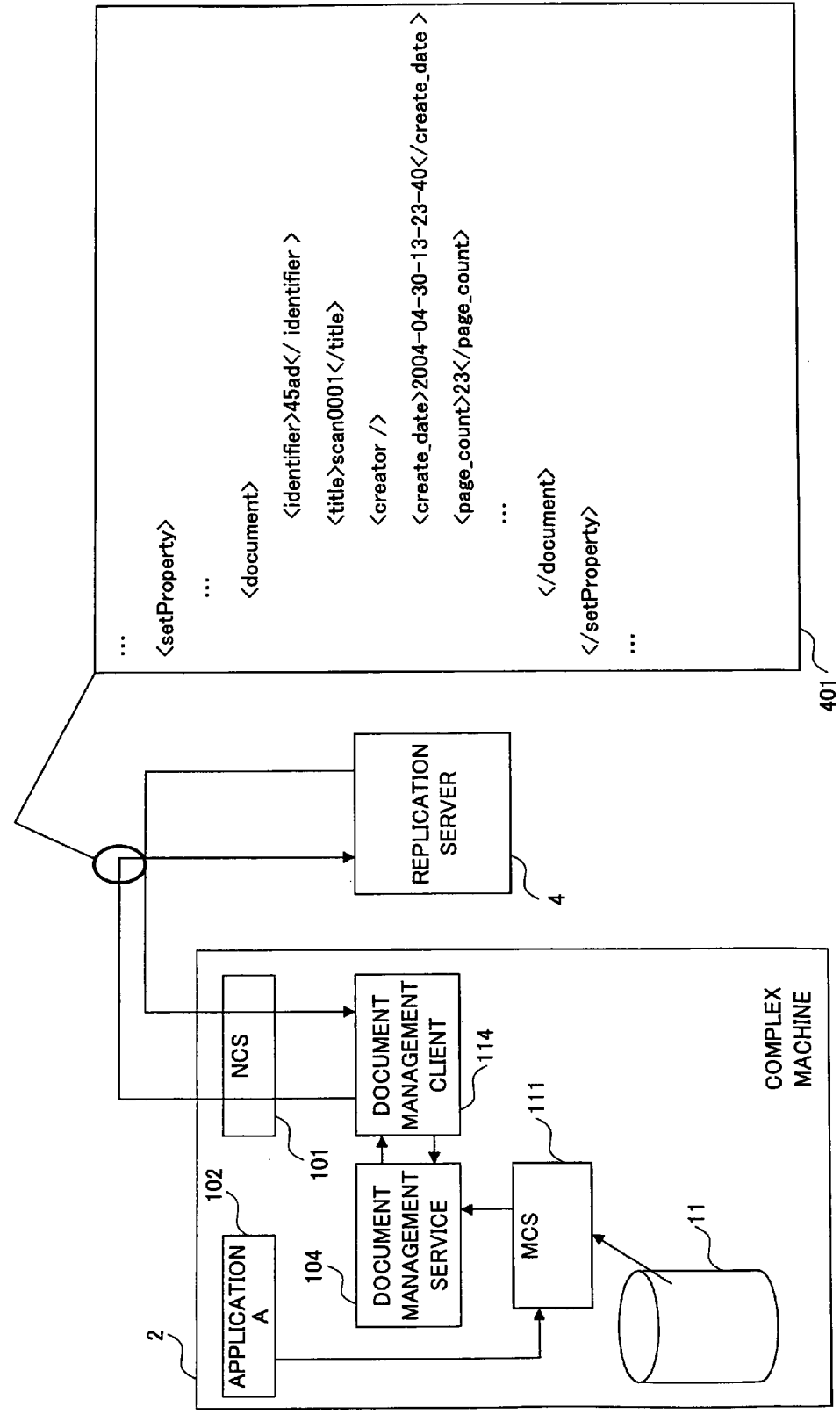
FIG. 21 schematically shows document information transmitted from the multifunction machine 2 to the replication server 4 when the document information is stored in the replication server.

FIG. 21 schematically shows document information transmitted to the replication server 4 from the multifunction machine 2 when the document information is stored in the replication server 4. For example, the document management client 114 transmits the document information 401 shown in FIG. 21 to the replication server 4, and thereby, it can store the document information in the replication server 4.

Figure 22:
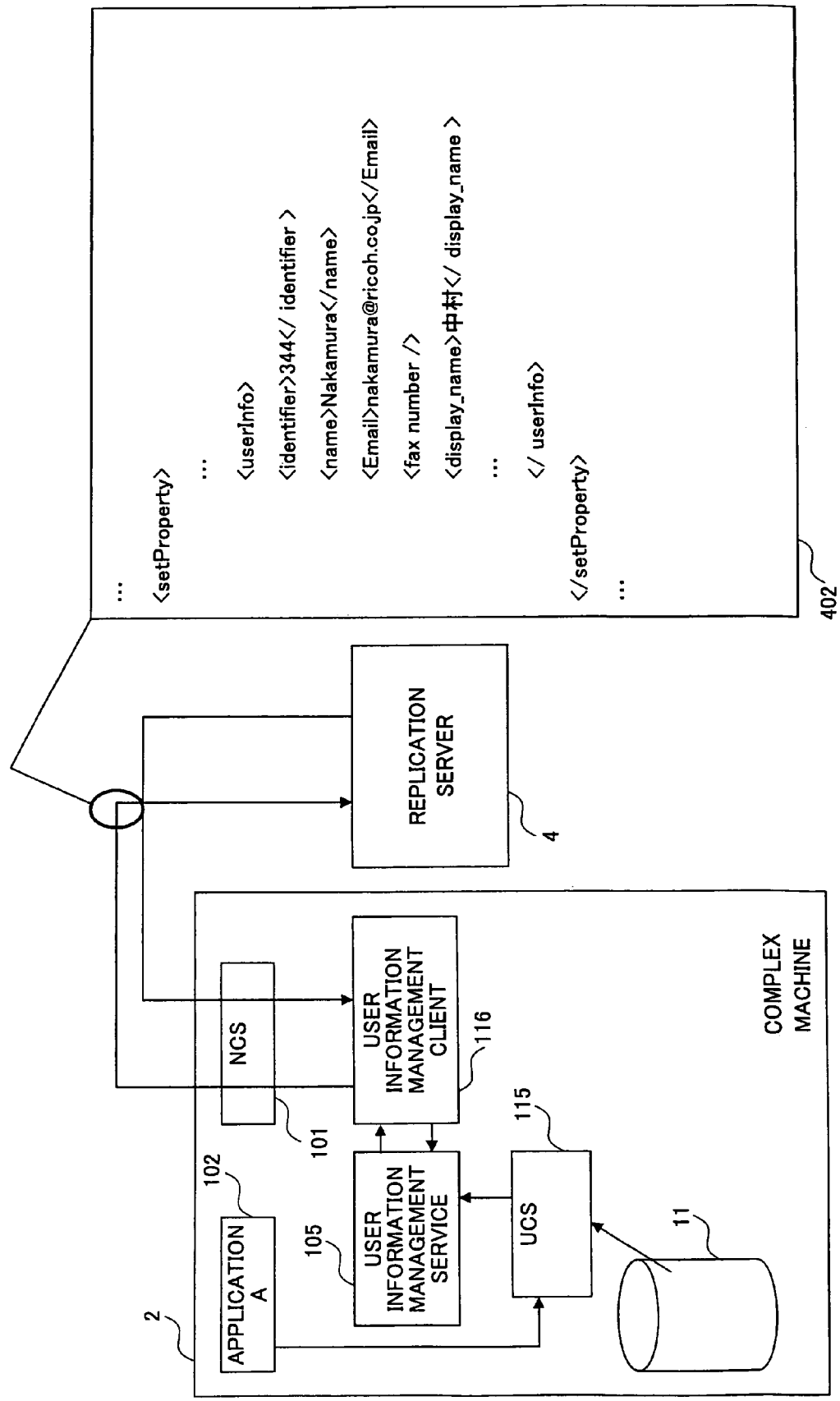
FIG. 22 schematically shows user information transmitted from the multifunction machine 2 to the replication server 4 when the user information is stored in the replication server.

FIG. 22 schematically shows user information transmitted to the replication server 4 from the multifunction machine 2 when the user information is stored in the replication server 4. For example, the document management client 114 transmits the user information 402 shown in FIG. 22 to the replication server 4, and thereby, it can store the user information in the replication server 4.

Figure 23:
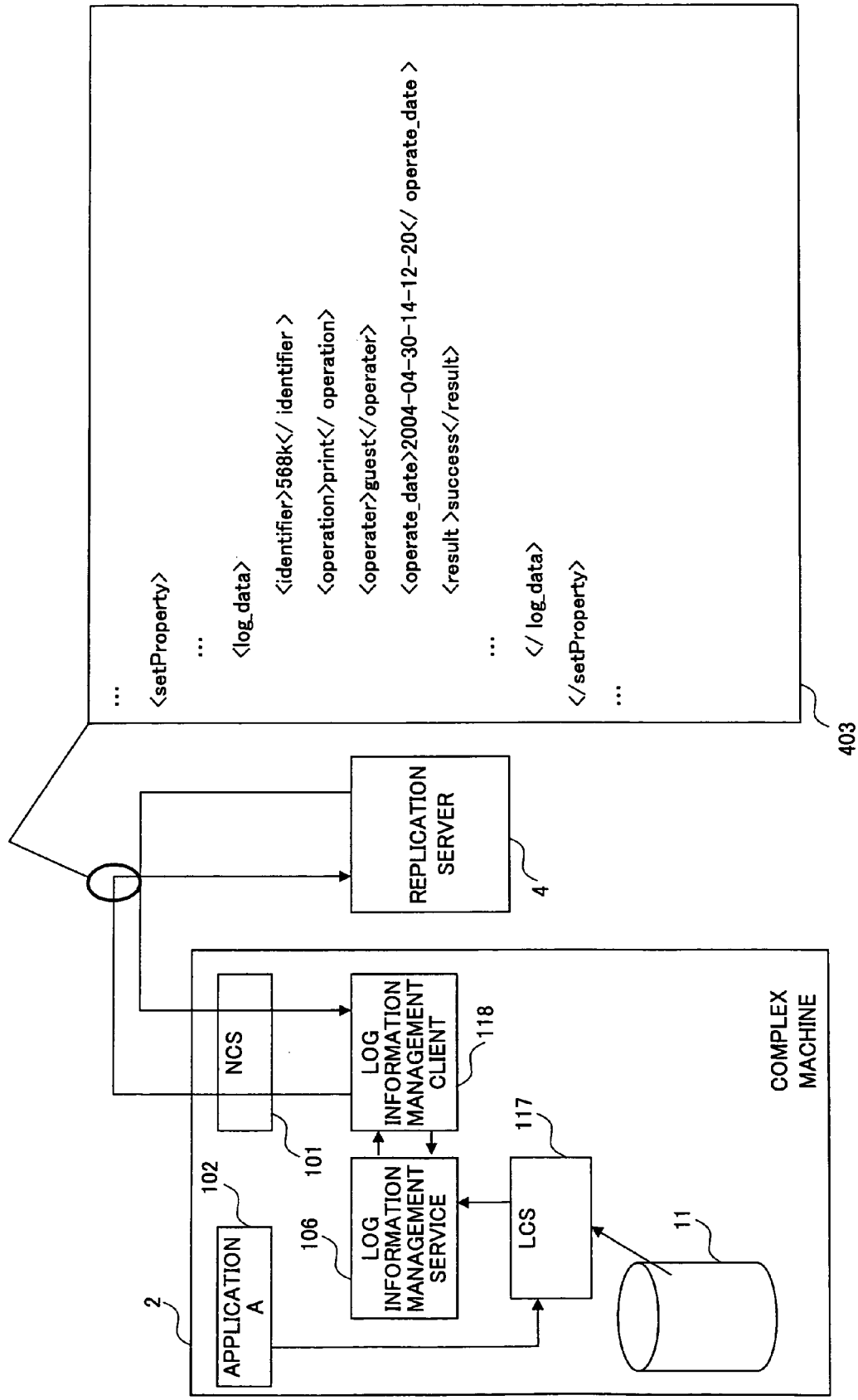
FIG. 23 schematically shows log information transmitted from the multifunction machine 2 to the replication server 4 when the log information is stored in the replication server.

FIG. 23 schematically shows log information transmitted to the replication server 4 from the multifunction machine 2 when the log information is stored in the replication server 4. For example, the document management client 114 transmits the log information 403 shown in FIG. 23 to the replication server 4, and thereby, it can store the log information in the replication server 4.

FIG. 24 schematically shows machine setting information transmitted to the replication server 4 from the multifunction machine 2 when the machine setting information is stored in the replication server 4. For example, the document management client 114 transmits the machine setting information 404 shown in FIG. 24 to the replication server 4, and thereby, it can store the machine setting information in the replication server 4.

Embodiment 5

In the above-described embodiments 1, 2 and 3, the power supply in the controller board 10 is turned on. However, instead, another configuration may also be applied in which power supply to all the parts other than the network I/F 12 is turned off. FIG. 25 shows a sequence diagram of processing in which document information stored in the multifunction machine 2 is referred to by the client 1. FIG. 25 shows an example in which power supply to all the parts other than the network I/F is turned off.

In Step S151, the client 1 notifies the network I/F 12 of a document information reference request via the communication network 3. The network I/F 12 checks a power supply state of the controller board 10, and, when power supply in the controller board 10 is turned off, the network I/F 12 analyzes the document information reference request, and refers to destination information. Then, in Step S152, the network I/F 12 transfers the document information reference request to the replication server 4 according to the thus-referred destination information.

The replication server 4 obtains the designated document information according to the received document information reference request. Then, in Step S153, the replication server 4 transmits the thus-obtained designated document information to the network I/F 12 of the multifunction machine 2 as a response to the reference request of Step S152. Then, in Step S154, the network I/F 12 transmits the thus-received designated document information to the client 1 via the network 3 as a response to the reference request of Step S151.

In the processing of FIG. 25, a copy of document information stored in the HDD 11 of the multifunction machine 2 is previously stored in the replication server 4 which does not enter a power saving mode, and thus, the same document information as that stored in the HDD 11 can be used without turning on power supply in the controller board 10 and in the HDD 11 for which the power soppy has been turned off.

Further, the present invention is not limited to the above-described embodiments, and variations and modifications may be made without departing from the basic concept of the present invention claimed in WHAT IS CLAIMED IS below. The present invention is different from sleep processing in the client 1 or such in that, according to the present invention, a copy of document information is stored in the replication server 4. Further, according to the present invention, when obtaining document information from the replication server 4 is failed in, power supply in the HDD 11 of the own machine is turned on again, and the document information is obtained therefrom. Accordingly, the present invention is also different from backup/restore processing in the client 1 or such.

The controller board 10 acts as a controller part; the HDD 11 acts as a storing part; the document management service 104 acts as an information management part; the document management client 114 acts as information requesting part; the MCS 111 acts as an access control part; the system memory 22 or the local memory 23 acts as a memory part, and the network I/F acts as a transfer part.

The present application is based on Japanese Priority Applications Nos. 2004-204987 and 2005-196803, filed on Jul. 12, 2004 and Jul. 5, 2005, respectively, the entire contents of which are hereby incorporated herein by reference.

What is claimed is:

1. An information processing apparatus having a plurality of power modes having different power consumptions, comprising:
    a storing part storing therein predetermined information; and
    a control part using the predetermined information from another server apparatus in which the predetermined information has been copied and stored, upon receiving a request for the predetermined information when the power mode of the storing part is a power saving mode, wherein
    the power saving mode of the plurality of power modes is different from a power turned off state of all modules of the information processing apparatus.

2. The information processing apparatus as claimed in claim 1, wherein:
    the control part obtains the predetermined information from the other server apparatus and carries out processing according to the request.

3. The information processing apparatus as claimed in claim 1, wherein:
the control part obtains the predetermined information on which said control part causes the other server to carry out at least a part of the processing according to the request.

4. The information processing apparatus as claimed in claim 1, wherein:
the control part comprises an information management part managing the predetermined information, and an information requesting part requesting a service from the other server apparatus; and
the information management part monitors the power mode of the storing part, and, the information management part uses the predetermined information from the other server apparatus with the use of the information requesting part upon receiving a request for the predetermined information when the power mode of the storing part is the power saving mode.

5. The information processing apparatus as claimed in claim 1, wherein:
the control part comprises an information management part managing the predetermined information, an access control part controlling access to the storing part and an information requesting part requesting a service from the other server apparatus;
the information management part notifies the access control part of a request upon receiving the request for the predetermined information; and
the access control part monitors the power mode of the storing part, and the access control part uses the predetermined information from the other server apparatus with the use of the information requesting part upon receiving a request for the predetermined information when the power mode of the storing part is the power saving mode.

6. The image processing apparatus as claimed in claim 1, wherein:
the control part updates the predetermined information stored in the other server apparatus when updating the predetermined information stored in the storing part.

7. The information processing apparatus as claimed in claim 1, wherein:
the control part updates the predetermined information stored in the other server apparatus with the predetermined information stored in the storing part when the power mode changes from an ordinary mode to the power saving mode.

8. The information processing apparatus as claimed in claim 1, wherein:
the control part records a part of the predetermined information stored in the storing part, which part is one having been updated, and, updates the predetermined information stored in the other server apparatus with the part of the predetermined information when the power mode of the storing part changes from an ordinary mode to the power saving mode.

9. The information processing apparatus as claimed in claim 1, wherein:
the control part causes the power mode of the storing part from the power saving mode to an ordinary mode, when failing in obtaining the predetermined information from the other server apparatus, obtains the predetermined from the storing part and carries out processing according to the request.

10. The information processing apparatus as claimed in claim 1, wherein:
the control part comprises a memory part for recording at least a part of the predetermined information stored in the storing part;
the control part uses said at least a part of the predetermined information from said memory upon receiving a request for the at least a part of the predetermined information when the power mode of the storing part is a power saving mode; and
the control part uses another part of the predetermined information not recorded in the memory part from the other server apparatus upon receiving a request for the other part of the predetermined information not recorded in the memory part.

11. The information processing apparatus as claimed in claim 1, wherein:
the control part stores the predetermined information, stored in the storing part, in the other server apparatus in the lump when the information processing apparatus is started up.

12. The information processing apparatus as claimed in claim 1, further comprising:
a transfer part transferring a request to the other server apparatus upon receiving a request for the predetermined information from a client via a communication network when the power mode of the control part is a power saving mode, and transferring a response from the other server apparatus to the client.

13. The information processing apparatus as claim in claim 1, wherein:
the control part makes a request to the other server apparatus for a service according to a file transfer protocol.

14. The information processing apparatus as claimed in claim 1, wherein:
the storing part stores therein at least one of document information, user information, log information and machine setting information.

15. The information processing apparatus as claimed in claim 1, wherein:
the storing part comprises a hard disk drive.

16. A power mode management method for an information processing apparatus having a plurality of power modes having different power consumptions, comprising:
receiving a request for predetermined information;
determining the power mode of a storing part in which the predetermined information is stored; and
using the predetermined information from another server apparatus in which the predetermined information has been copied and stored, when the power mode is a power saving mode, wherein
the power saving mode of the plurality of power modes is different from a power turned off state of all modules of the information processing apparatus.

17. The power mode management method as claimed in claim 16, further comprising:
causing the power mode of the storing part from the power saving mode to an ordinary mode, when failing in obtaining the predetermined information from the other server apparatus, obtaining the predetermined information from the storing part and carrying out processing according to the request.

18. The power mode management method as claimed in claim 16, further comprising:
updating the predetermined information stored in the other server apparatus when updating the predetermined information stored in the storing part.

19. The power mode management method as claimed in claim 16, further comprising:

updating the predetermined information stored in the other server apparatus with the predetermined information stored in the storing part when the power mode changes from an ordinary mode to the power saving mode.

20. The power mode management method as claimed in claim 16, further comprising:

recording a part of the predetermined information stored in the storing part, which part is one having been updated; and updating the predetermined information stored in the other server apparatus with the part of the predetermined information when the power mode changes from an ordinary mode to the power saving mode.

21. A power mode management program stored on a computer readable non-transitory information recording medium comprising instructions for causing a computer, having a plurality of power modes having different power consumptions, to function as:

a control part using the predetermined information from another server apparatus in which the predetermined information has been copied and stored, upon receiving a request for the predetermined information when the power mode of a storing part, in which the predetermined information is stored, is a power saving mode, wherein the power saving mode of the plurality of power modes is different from a power turned off state of all modules of the computer.

* * * * *